United States Patent
Yu et al.

(10) Patent No.: US 12,363,632 B2
(45) Date of Patent: Jul. 15, 2025

(54) CELL SELECTION METHOD AND APPARATUS

(71) Applicant: Huawei Technologies Co., Ltd., Shenzhen (CN)

(72) Inventors: Xiaoyong Yu, Shanghai (CN); Tanyue Xu, Shanghai (CN); Bin Xia, Shanghai (CN); Zhiyong Chen, Shanghai (CN); Weilin Gong, Shenzhen (CN); Zhilin Zhao, Shanghai (CN); Haiquan Yang, Shanghai (CN); Bingguang Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 18/003,637

(22) PCT Filed: May 28, 2021

(86) PCT No.: PCT/CN2021/096679
§ 371 (c)(1),
(2) Date: Dec. 28, 2022

(87) PCT Pub. No.: WO2022/001532
PCT Pub. Date: Jan. 6, 2022

(65) Prior Publication Data
US 2023/0239781 A1 Jul. 27, 2023

(30) Foreign Application Priority Data
Jun. 29, 2020 (CN) .......................... 202010605386.4

(51) Int. Cl.
*H04W 48/00* (2009.01)
*H04W 24/02* (2009.01)
(Continued)

(52) U.S. Cl.
CPC .......... *H04W 48/20* (2013.01); *H04W 24/02* (2013.01); *H04L 1/0003* (2013.01)

(58) Field of Classification Search
CPC .... H04L 1/0003; H04L 1/0009; H04W 24/02; H04W 28/0846; H04W 28/16;
(Continued)

(56) References Cited

U.S. PATENT DOCUMENTS

| | | | |
|---|---|---|---|
| 8,638,759 B2 * | 1/2014 | Ji | A61P 35/00 370/332 |
| 2009/0190500 A1 * | 7/2009 | Ji | A61P 35/00 370/254 |

(Continued)

FOREIGN PATENT DOCUMENTS

| | | |
|---|---|---|
| CN | 102917436 A | 2/2013 |
| CN | 102823300 B | 1/2016 |

(Continued)

*Primary Examiner* — Frank Duong
(74) *Attorney, Agent, or Firm* — Conley Rose, P.C.

(57) ABSTRACT

A cell selection method, related to the communications field, includes a terminal device sending a first request to a network device, where the first request is used to request to select a serving cell for the terminal device in an energy efficiency first manner. The terminal device sends first information to the network device, where the first information is used by the network device to select a cell in a first communications system or a cell in a second communications system for the terminal device. The terminal device receives configuration information of a serving cell from the network device, where the serving cell is selected by the network device from the cell in the first communications system or the cell in the second communications system in a manner that energy efficiency of the terminal device is first.

20 Claims, 8 Drawing Sheets

(51) Int. Cl.
*H04W 48/20* (2009.01)
*H04L 1/00* (2006.01)

(58) Field of Classification Search
CPC ..... H04W 36/04; H04W 36/20; H04W 36/22;
H04W 36/26; H04W 40/18; H04W 48/16;
H04W 48/18; H04W 48/20; H04W 52/02;
H04W 52/0212; H04W 84/045; Y02D
30/70
See application file for complete search history.

(56) References Cited

U.S. PATENT DOCUMENTS

| | | | | |
|---|---|---|---|---|
| 2013/0260762 | A1* | 10/2013 | Tomita | H04W 36/304 |
| | | | | 455/436 |
| 2014/0171143 | A1 | 6/2014 | Liu et al. | |
| 2022/0353163 | A1* | 11/2022 | Ramamurthi | H04B 17/309 |

FOREIGN PATENT DOCUMENTS

| | | |
|---|---|---|
| CN | 103491620 B | 7/2016 |
| CN | 107231681 A | 10/2017 |
| CN | 108668338 A | 10/2018 |
| EP | 2675233 A1 | 12/2013 |
| GB | 2506888 B | 3/2015 |

* cited by examiner

CELL SELECTION METHOD AND APPARATUS

CROSS-REFERENCE TO RELATED APPLICATIONS

This is a National Stage of International Patent Application No. PCT/CN2021/096679 filed on May 28, 2021, which claims priority to Chinese Patent Application No. 202010605386.4 filed on Jun. 29, 2020. Both of the aforementioned applications are hereby incorporated by reference in their entireties.

TECHNICAL FIELD

This application relates to communications technologies, and in particular, to a cell selection method and apparatus.

BACKGROUND

A terminal device usually performs communication in a serving cell configured by a base station, for example, the terminal device may send uplink data or receive downlink data based on network support of the serving cell.

In a possible design, when selecting the serving cell for the terminal device, the base station may select the cell based on related indicators, such as user fairness, channel quality, base station energy efficiency, a throughput, and load. For example, the base station configures a resource and selects the cell for the terminal device according to a principle of spectral efficiency maximization, to implement a high throughput, and the like.

However, in a general implementation in which the base station configures the serving cell for the terminal device, that the terminal device consumes large energy often occurs.

SUMMARY

Embodiments of this application provide a cell selection method and apparatus, to select, for a terminal device based on an energy efficiency first request of the terminal device, a cell when energy efficiency is first, so as to reduce energy consumed by the terminal device during communication.

According to a first aspect, an embodiment of this application provides a cell selection method. The method includes: A terminal device sends a first request to a network device. The first request is used to request to select a serving cell for the terminal device in an energy efficiency first manner. The terminal device sends first information to the network device. The first information is used by the network device to select a cell in a first communications system or a cell in a second communications system for the terminal device. The terminal device receives configuration information of a serving cell from the network device. The serving cell is selected by the network device from the cell in the first communications system or the cell in the second communications system in a manner that energy efficiency of the terminal device is first. In this way, the network device can select, for the terminal device based on an energy efficiency first request of the terminal device, a cell when energy efficiency is first, to reduce energy consumed by the terminal device during communication.

In a possible implementation, the first information includes a communications system selection parameter when energy efficiency of the terminal device is first, and transmit power when energy efficiency of the terminal device is first. The serving cell is specifically selected by the network device based on the communications system selection parameter and the transmit power. Uplink transmit power of the terminal device is not greater than the transmit power in the serving cell. Before that the terminal device sends first information to the network device, the method further includes: The terminal device receives a first bandwidth range and a second bandwidth range from the network device. The first bandwidth range is used to indicate an available bandwidth range of a first communications system. The second bandwidth range is used to indicate an available bandwidth range of a second communications system. The terminal device calculates, based on the first bandwidth range and the second bandwidth range, a communications system selection parameter when energy efficiency of the terminal device is first, and transmit power when energy efficiency of the terminal device is first. In this way, the terminal device may calculate, based on the available bandwidth range indicated by the network device, the communications system selection parameter and the transmit power when energy efficiency is first, so that communication with low power consumption can be implemented subsequently based on the communications system selection parameter and the transmit power.

In a possible implementation, that the terminal device calculates, based on the first bandwidth range and the second bandwidth range, a communications system selection parameter when energy efficiency of the terminal device is first includes: The terminal device determines a quantity of physical resource blocks of the first communications system and a quantity of physical resource blocks of the second communications system based on the first bandwidth range and the second bandwidth range. The terminal device calculates, based on total uplink power of the first communications system, an uplink rate of the first communications system, the quantity of the physical resource blocks of the first communications system, a modulation and coding scheme of the first communications system, total uplink power of the second communications system, an uplink rate of the second communications system, the quantity of the physical resource blocks of the second communications system, and a modulation and coding scheme of the second communications system, the communications system selection parameter when energy efficiency of the terminal device is first.

In a possible implementation, that the terminal device calculates a communications system selection parameter when energy efficiency of the terminal device is first meets the following formula:

$$\max_{Q,W,MCS} Q \frac{v_1(RB_1, MCS_1)}{P_1} + (1-Q) \frac{v_2(RB_2, MCS_2)}{P_2},$$

Q is the communications system selection parameter, $P_1$ is the total uplink power of the first communications system, $v_1$ is the uplink rate of the first communications system. $RB_1$ is the quantity of the physical resource blocks of the first communications system, $MCS_1$ is the modulation and coding scheme of the first communications system, $P_2$ is the total uplink power of the second communications system, $v_2$ is the uplink rate of the second communications system. $RB_2$ is the quantity of the physical resource blocks of the second communications system, and $MCS_2$ is the modulation and coding scheme of the second communications system.

In a possible implementation, the first information includes a rate threshold, and the serving cell is specifically selected by the network device based on the rate threshold and a downlink rate of a current task.

In a possible implementation, the first information further includes first power and second power. The first power is basic consumed power of the terminal device in the first communications system. The second power is basic consumed power of the terminal device in the second communications system. The first power is less than the second power. The serving cell is specifically selected by the network device based on the downlink rate of the current task, the rate threshold, the first power, and the second power.

In a possible implementation, when the downlink rate of the current task is less than or equal to the rate threshold, the serving cell is a cell in the first communications system. Alternatively, when the downlink rate of the current task is greater than the rate threshold, selecting of the serving cell meets the following formula:

$$\max_{x, W, MCS} x \frac{v_3(RB_3, MCS_3)}{P_3} + (1-x) \frac{v_4(RB_4, MCS_4)}{P_4},$$

x is a discrete binary function of 0 or 1, $P_3$ is the first power, $v_3$ is a downlink rate of the first communications system. $RB_3$ is a quantity of physical resource blocks of the first communications system. $MCS_3$ is a modulation and coding scheme of the first communications system, $P_4$ is the second power, $v_4$ is a downlink rate of the second communications system. $RB_4$ is a quantity of physical resource blocks of the second communications system, and $MCS_4$ is a modulation and coding scheme of the second communications system.

In a possible implementation, that a terminal device sends a first request to a network device includes: The terminal device sends the first request to the network device based on a user configuration. Alternatively, when the terminal device detects that remaining battery power is less than a battery power threshold, the terminal device sends the first request to the network device. Alternatively, when the terminal device detects that remaining battery power is less than a battery power threshold, the terminal device displays a user interface used to prompt a user to configure energy efficiency first, and the terminal device sends the first request to the network device based on a configuration received from the user interface.

According to a second aspect, an embodiment of this application provides a cell selection method. The method includes: A network device receives a first request and first information from a terminal device. The first request is used to request to select a serving cell for the terminal device in an energy efficiency first manner. The first information is used by the network device to select a cell in a first communications system or a cell in a second communications system for the terminal device. The network device selects a serving cell for the terminal device based on the first request and the first information. The network device sends configuration information of the serving cell to the terminal device.

In a possible implementation, that the network device selects a serving cell for the terminal device based on the first request and the first information includes: The network device sends a first bandwidth range and a second bandwidth range to the terminal device based on the first request. The first bandwidth range is used to indicate an available bandwidth range of the first communications system. The second bandwidth range is used to indicate an available bandwidth range of the second communications system. The network device receives the first information from the terminal device. The first information includes a communications system selection parameter and transmit power. The communications system selection parameter and the transmit power are obtained by the terminal device through calculating based on the first bandwidth range and the second bandwidth range when energy efficiency of the terminal device is first. The network device selects the serving cell based on the communications system selection parameter and the transmit power. Uplink transmit power of the terminal device is not greater than the transmit power in the serving cell.

In a possible implementation, obtaining of the communications system selection parameter and the transmit power is specifically as follows: The terminal device determines a quantity of physical resource blocks of the first communications system and a quantity of physical resource blocks of the second communications system based on the first bandwidth range and the second bandwidth range. The terminal device performs calculation, based on total uplink power of the first communications system, an uplink rate of the first communications system, the quantity of the physical resource blocks of the first communications system, a modulation and coding scheme of the first communications system, total uplink power of the second communications system, an uplink rate of the second communications system, the quantity of the physical resource blocks of the second communications system, and a modulation and coding scheme of the second communications system, when energy efficiency of the terminal device is first.

In a possible implementation, the obtaining of the communications system selection parameter meets the following formula:

$$\max_{Q, W, MCS} Q \frac{v_1(RB_1, MCS_1)}{P_1} + (1-Q) \frac{v_2(RB_2, MCS_2)}{P_2},$$

Q is the communications system selection parameter, $P_1$ is the total uplink power of the first communications system, $v_1$ is the uplink rate of the first communications system. $RB_1$ is the quantity of the physical resource blocks of the first communications system, $MCS_1$ is the modulation and coding scheme of the first communications system, $P_2$ is the total uplink power of the second communications system, $v_2$ is the uplink rate of the second communications system, $RB_2$ is the quantity of the physical resource blocks of the second communications system, and $MCS_2$ is the modulation and coding scheme of the second communications system.

In a possible implementation, the first information includes a rate threshold. That the network device selects a serving cell for the terminal device based on the first request and the first information includes: The network device selects the serving cell based on the rate threshold and a downlink rate of a current task.

In a possible implementation, the first information further includes first power and second power. The first power is basic consumed power of the terminal device in the first communications system. The second power is basic consumed power of the terminal device in the second communications system. The first power is less than the second power. That the network device selects a serving cell for the terminal device based on the first request and the first information includes: The network device selects the serving cell based on the downlink rate of the current task, the rate threshold, the first power, and the second power.

In a possible implementation, that the network device selects the serving cell based on the downlink rate of the current task, the rate threshold, the first power, and the second power includes: When the downlink rate of the current task is less than or equal to the rate threshold, the network device selects the serving cell that is a cell in the first communications system. Alternatively, when the downlink rate of the current task is greater than the rate threshold, that the network device selects the serving cell meets the following formula:

$$\max_{x,W,MCS} x \frac{v_3(RB_3, MCS_3)}{P_3} + (1-x)\frac{v_4(RB_4, MCS_4)}{P_4},$$

x is a discrete binary function of 0 or 1, $P_3$ is the first power, $v_3$ is a downlink rate of the first communications system. $RB_3$ is a quantity of physical resource blocks of the first communications system. $MCS_3$ is a modulation and coding scheme of the first communications system. $P_4$ is the second power, $v_4$ is a downlink rate of the second communications system, $RB_4$ is a quantity of physical resource blocks of the second communications system, and $MCS_4$ is a modulation and coding scheme of the second communications system.

In a possible implementation, the first request is sent by the terminal device based on a user configuration. Alternatively, the first request is sent when the terminal device detects that remaining battery power is lower than a battery power threshold. Alternatively, when the terminal device detects that remaining battery power is less than a battery power threshold, the first request is sent in a manner that the terminal device displays a user interface used to prompt a user to configure energy efficiency first, and performs sending based on a configuration received from the user interface.

According to a third aspect, an embodiment of this application provides a cell selection apparatus. The cell selection apparatus may be a terminal device, or may be a chip or a chip system in a terminal device. The cell selection apparatus may include a processing unit and a communication unit. When the cell selection apparatus is the terminal device, the processing unit may be a processor, and the communication unit may be a communication interface or an interface circuit. The cell selection apparatus may further include a storage unit, and the storage unit may be a memory. The storage unit is configured to store an instruction, and the processing unit executes the instruction stored in the storage unit, so that the terminal device implements the cell selection method according to the first aspect or any one of the possible implementations of the first aspect. When the cell selection apparatus is the chip or the chip system in the terminal device, the processing unit may be a processor, and the communication unit may be a communication interface. For example, the communication interface may be an input/output interface, a pin, or a circuit. The processing unit executes an instruction stored in a storage unit, so that the terminal device implements the cell selection method according to the first aspect or any one of the possible implementations of the first aspect. The storage unit may be a storage unit (for example, a register or a cache) in the chip, or may be a storage unit (for example, a read-only memory or a random access memory) that is located outside the chip and that is in the terminal device.

For example, the communication unit is configured to send a first request to a network device. The first request is used to request to select a serving cell for the terminal device in an energy efficiency first manner. The communication unit is further configured to send first information to the network device. The first information is used by the network device to select a cell in a first communications system or a cell in a second communications system for the terminal device. The communication unit is further configured to receive configuration information of a serving cell from the network device. The serving cell is selected by the network device from the cell in the first communications system or the cell in the second communications system in a manner that energy efficiency of the terminal device is first.

In a possible implementation, the first information includes a communications system selection parameter when energy efficiency of the terminal device is first, and transmit power when energy efficiency of the terminal device is first. The serving cell is specifically selected by the network device based on the communications system selection parameter and the transmit power. Uplink transmit power of the terminal device is not greater than the transmit power in the serving cell. The communication unit is further configured to receive a first bandwidth range and a second bandwidth range from the network device. The first bandwidth range is used to indicate an available bandwidth range of a first communications system. The second bandwidth range is used to indicate an available bandwidth range of a second communications system. The processing unit is configured to calculate, based on the first bandwidth range and the second bandwidth range, a communications system selection parameter when energy efficiency of the terminal device is first, and transmit power when energy efficiency of the terminal device is first.

In a possible implementation, the processing unit is specifically configured to: determine a quantity of physical resource blocks of the first communications system and a quantity of physical resource blocks of the second communications system based on the first bandwidth range and the second bandwidth range; and calculate, based on total uplink power of the first communications system, an uplink rate of the first communications system, the quantity of the physical resource blocks of the first communications system, a modulation and coding scheme of the first communications system, total uplink power of the second communications system, an uplink rate of the second communications system, the quantity of the physical resource blocks of the second communications system, and a modulation and coding scheme of the second communications system, the communications system selection parameter when energy efficiency of the terminal device is first.

In a possible implementation, that the processing unit calculates the communications system selection parameter when energy efficiency of the terminal device is first meets the following formula $$\max_{Q,W,MCS} Q\frac{v_1(RB_1, MCS_1)}{P_1} + (1-Q)\frac{v_2(RB_2, MCS_2)}{P_2},$$

Q is the communications system selection parameter, $P_1$ is the total uplink power of the first communications system, $v_1$ is the uplink rate of the first communications system, $RB_1$ is the quantity of the physical resource blocks of the first communications system. $MCS_1$ is the modulation and coding scheme of the first communications system, $P_2$ is the total uplink power of the second communications system, $v_2$ is the uplink rate of the second communications system. $RB_2$ is the quantity of the physical resource blocks of the second communications system, and $MCS_2$ is the modulation and coding scheme of the second communications system.

In a possible implementation, the first information includes a rate threshold, and the serving cell is specifically selected by the network device based on the rate threshold and a downlink rate of a current task.

In a possible implementation, the first information further includes first power and second power. The first power is basic consumed power of the terminal device in the first communications system. The second power is basic consumed power of the terminal device in the second communications system. The first power is less than the second power. The serving cell is specifically selected by the network device based on the downlink rate of the current task, the rate threshold, the first power, and the second power.

In a possible implementation, when the downlink rate of the current task is less than or equal to the rate threshold, the serving cell is a cell in the first communications system.

Alternatively, when the downlink rate of the current task is greater than the rate threshold, selecting of the serving cell meets the following formula:

$$\max_{x,W,MCS} x \frac{v_3(RB_3, MCS_3)}{P_3} + (1-x)\frac{v_4(RB_4, MCS_4)}{P_4},$$

x is a discrete binary function of 0 or 1, $P_3$ is the first power, $v_3$ is a downlink rate of the first communications system, $RB_3$ is a quantity of physical resource blocks of the first communications system $MCS_3$ is a modulation and coding scheme of the first communications system, $P_4$ is the second power, $v_4$ is a downlink rate of the second communications system, $RB_4$ is a quantity of physical resource blocks of the second communications system, and $MCS_4$ is a modulation and coding scheme of the second communications system.

In a possible implementation, the communication unit is specifically configured to send the first request to the network device based on a user configuration. Alternatively, the communication unit is specifically configured to: detect that remaining battery power is less than a battery power threshold, and send the first request to the network device. Alternatively, the apparatus further includes a display unit, configured to detect that remaining battery power is less than a battery power threshold, and display a user interface used to prompt a user to configure energy efficiency first. The communication unit is specifically configured to send the first request to the network device based on a configuration received from the user interface.

According to a fourth aspect, an embodiment of this application provides a cell selection apparatus. The cell selection apparatus may be a network device, or may be a chip or a chip system in a network device. The cell selection apparatus may include a processing unit and a communication unit. When the cell selection apparatus is the network device, the processing unit may be a processor, and the communication unit may be a communication interface or an interface circuit. The cell selection apparatus may further include a storage unit, and the storage unit may be a memory. The storage unit is configured to store an instruction, and the processing unit executes the instruction stored in the storage unit, so that the network device implements the cell selection method according to the second aspect or any one of the possible implementations of the second aspect. When the cell selection apparatus is the chip or the chip system in the network device, the processing unit may be a processor, and the communication unit may be a communication interface. For example, the communication interface may be an input/output interface, a pin, or a circuit. The processing unit executes an instruction stored in a storage unit, so that the network device implements the cell selection method according to the second aspect or any one of the possible implementations of the second aspect. The storage unit may be a storage unit (for example, a register or a cache) in the chip, or may be a storage unit (for example, a read-only memory or a random access memory) that is located outside the chip and that is in the network device.

For example, the communication unit is configured to receive a first request and first information from a terminal device. The first request is used to request to select a serving cell for the terminal device in an energy efficiency first manner. The first information is used by the network device to select a cell in a first communications system or a cell in a second communications system for the terminal device. The processing unit is configured to select a serving cell for the terminal device based on the first request and the first information. The communication unit is further configured to send configuration information of the serving cell to the terminal device.

In a possible implementation, the communication unit is further configured to send a first bandwidth range and a second bandwidth range to the terminal device based on the first request. The first bandwidth range is used to indicate an available bandwidth range of the first communications system. The second bandwidth range is used to indicate an available bandwidth range of the second communications system. The communication unit is further configured to receive the first information from the terminal device. The first information includes a communications system selection parameter and transmit power. The communications system selection parameter and the transmit power are obtained by the terminal device through calculating based on the first bandwidth range and the second bandwidth range when energy efficiency of the terminal device is first. The processing unit is further configured to select the serving cell based on the communications system selection parameter and the transmit power. Uplink transmit power of the terminal device is not greater than the transmit power in the serving cell.

In a possible implementation, obtaining of the communications system selection parameter and the transmit power is specifically as follows: The terminal device determines a quantity of physical resource blocks of the first communications system and a quantity of physical resource blocks of the second communications system based on the first bandwidth range and the second bandwidth range. The terminal device performs calculation, based on total uplink power of the first communications system, an uplink rate of the first communications system, the quantity of the physical resource blocks of the first communications system, a modulation and coding scheme of the first communications system, total uplink power of the second communications system, an uplink rate of the second communications system, the quantity of the physical resource blocks of the second communications system, and a modulation and coding scheme of the second communications system, when energy efficiency of the terminal device is first.

In a possible implementation, the obtaining of the communications system selection parameter meets the following formula:

$$\max_{Q,W,MCS} Q \frac{v_1(RB_1, MCS_1)}{P_1} + (1-Q)\frac{v_2(RB_2, MCS_2)}{P_2},$$

Q is the communications system selection parameter, $P_1$ is the total uplink power of the first communications system, $v_1$ is the uplink rate of the first communications system, $RB_1$ is the quantity of the physical resource blocks of the first communications system, $MCS_1$ is the modulation and coding scheme of the first communications system, $P_2$ is the total uplink power of the second communications system, $v_2$ is the uplink rate of the second communications system, $RB_2$ is the quantity of the physical resource blocks of the second communications system, and $MCS_2$ is the modulation and coding scheme of the second communications system.

In a possible implementation, the first information includes a rate threshold. The processing unit is specifically configured to select the serving cell based on the rate threshold and a downlink rate of a current task.

In a possible implementation, the first information further includes first power and second power. The first power is basic consumed power of the terminal device in the first communications system. The second power is basic consumed power of the terminal device in the second communications system. The first power is less than the second power. The processing unit is specifically configured to select the serving cell based on the downlink rate of the current task, the rate threshold, the first power, and the second power.

In a possible implementation, the processing unit is specifically configured to: when the downlink rate of the current task is less than or equal to the rate threshold, select the serving cell that is a cell in the first communications system. Alternatively, when the downlink rate of the current task is greater than the rate threshold, selecting of the serving cell meets the following formula:

$$\max_{x,W,MCS} x \frac{v_3(RB_3, MCS_3)}{P_3} + (1-x)\frac{v_4(RB_4, MCS_4)}{P_4},$$

x is a discrete binary function of 0 or 1, $P_3$ is the first power, $v_3$ is a downlink rate of the first communications system, $RB_3$ is a quantity of physical resource blocks of the first communications system, $MCS_3$ is a modulation and coding scheme of the first communications system, $P_4$ is the second power, $v_4$ is a downlink rate of the second communications system, $RB_4$ is a quantity of physical resource blocks of the second communications system, and $MCS_4$ is a modulation and coding scheme of the second communications system.

In a possible implementation, the first request is sent by the terminal device based on a user configuration. Alternatively, the first request is sent when the terminal device detects that remaining battery power is lower than a battery power threshold. Alternatively, when the terminal device detects that remaining battery power is less than a battery power threshold, the first request is sent in a manner that the terminal device displays a user interface used to prompt a user to configure energy efficiency first, and performs sending based on a configuration received from the user interface.

According to a fifth aspect, an embodiment of this application provides a computer-readable storage medium. The computer-readable storage medium stores a computer program or an instruction. When the computer program or the instruction is run on a computer, the computer is enabled to perform the method according to any one of the implementations of the first aspect to the second aspect.

According to a sixth aspect, an embodiment of this application provides a computer program product including an instruction. When the instruction is run on a computer, the computer is enabled to perform the method according to any one of the implementations of the first aspect to the second aspect.

According to a seventh aspect, an embodiment of this application provides a communications system. The communications system includes any one or more of the following: the cell selection apparatus according to the third aspect and the possible implementations, and the cell selection apparatus according to the fourth aspect and the possible implementations of the fourth aspect.

According to an eighth aspect, an embodiment of this application provides a cell selection apparatus. The cell selection apparatus includes a processor and a storage medium. The storage medium stores an instruction. When the instruction is run by the processor, the cell selection method according to any one of the implementations of the first aspect to the second aspect is implemented.

According to a ninth aspect, this application provides a chip or a chip system. The chip or the chip system includes at least one processor and a communication interface. The communication interface is interconnected to the at least one processor through a line, and the at least one processor is configured to run a computer program or an instruction, to perform the cell selection method according to any one of the implementations of the first aspect to the second aspect.

The communication interface in the chip may be an input/output interface, a pin, a circuit, or the like.

In a possible implementation, the chip or the chip system described above in this application further includes at least one memory. The at least one memory stores an instruction. The memory may be a storage unit inside the chip, for example, a register or a cache, or may be a storage unit (for example, a read-only memory or a random access memory) of the chip.

It should be understood that technical solutions in the second aspect to the ninth aspect of embodiments of this application correspond to technical solutions in the first aspect of embodiments of this application, and beneficial effects achieved by the aspects and the corresponding feasible implementations are similar. Details are not described again.

DESCRIPTION OF EMBODIMENTS

Figure 1:
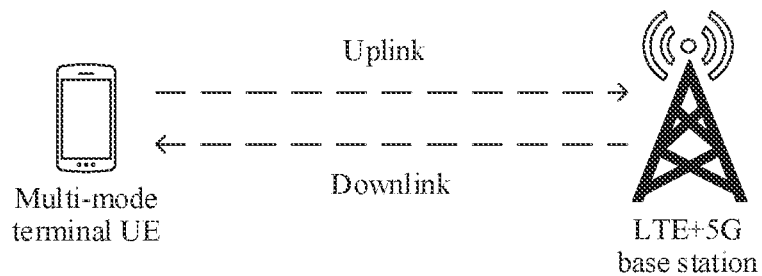
FIG. 1 is a schematic diagram of a network architecture according to an embodiment of this application.

To clearly describe the technical solutions in embodiments of this application, terms such as "first" and "second" are used in embodiments of this application to distinguish between same items or similar items that provide basically same functions or purposes. For example, a first network and a second network are merely intended to distinguish between different networks, and are not intended to limit a sequence thereof. A person skilled in the art may understand that the terms such as "first" and "second" do not limit a quantity and an execution sequence, and the terms such as "first" and "second" do not indicate a definite difference.

It should be noted that, in this application, words such as "example" or "for example" are used for representing giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

A method according to embodiments of this application may be applied to a non-standalone communications system. The non-standalone communications system may include a plurality of communications systems that perform communication by using different communications standards. A specific communications system may include a long term evolution (long term evolution, LTE) communications system, a 5th generation (5th Generation, 5G) mobile communications system, a future mobile communications system, or the like.

For example, in a deployment process of 5G, a signal frequency used in 5G is higher than a signal frequency used in LTE, and a coverage area of a 5G base station is greatly reduced compared with a coverage area of an LTE base station. Therefore, when continuous coverage is provided, whether 5G can provide good coverage becomes a factor that needs to be considered. To achieve same coverage, 5G needs to increase a quantity of base stations. However, deployment of dense 5G base stations causes huge energy consumption and signaling overheads of the base station. Therefore, the 3rd Generation Partnership Project (3rd Generation Partnership Project, 3GPP) standard proposes a non-standalone architecture as a transition solution for an operator to deploy a 5G network. In the non-standalone architecture, the 5G system may depend on a network architecture in which a 4G base station works, and non-standalone (non stand alone, NSA) signaling (such as registration and authentication) between a radio network of 5G and a core network of 5G is transmitted by using the 4G base station.

In a possible implementation, the non-standalone communications system in embodiments of this application is not limited to a communications system that uses the non-standalone architecture. The non-standalone communications system in embodiments of this application may generally refer to a system that performs communication by using communications systems of a plurality of communications standards. Each specific communications system may be a communications system with a standalone architecture, or may be a communications system with a non-standalone architecture. This is not specifically limited in embodiments of this application.

In the non-standalone communications system, finding an appropriate cell selection solution is of great significance to improving network performance and user experience. In one aspect, a base station needs to select an appropriate serving cell for a terminal device, to reduce network load and improve a network throughput. In another aspect, large-scale fading of a 5G channel is severe due to an increase in a carrier. In this case, to achieve a higher rate than a rate of an LTE network, energy consumed by the terminal device faces a severe challenge. Designing an appropriate resource configuration and cell selection solution can reduce energy consumption pressure of the terminal.

In a possible implementation, the base station may select the serving cell for the terminal device according to a principle of spectral efficiency maximization. For example, in LTE/5G networking, the base station selects, based on strength of a signal to interference plus noise ratio (signal to interference plus noise ratio, SINR) of a received uplink reference signal, a network used by the terminal device. For example, if a SINR value of an LTE reference signal is greater than a SINR value of a 5G reference signal, the LTE network is configured for the terminal; or otherwise, the 5G network is configured. In addition, to save bandwidth resources, the base station tends to allocate a small quantity of physical resource blocks (resource blocks, RBs) and a high order of a modulation and coding scheme (modulation and coding scheme, MCS) to the terminal device. However, in an implementation in which the base station configures a resource and selects the cell for the terminal device according to the principle of spectral efficiency maximization, a high throughput can be implemented; but the terminal device needs to be supported by higher transmit power to implement high spectral efficiency, and consequently, energy consumed by the terminal device is large.

In a possible implementation, in LTE/5G networked downlink transmission, the base station selects the serving cell for the terminal device based on a data packet size threshold vth. When a downlink data packet is less than the threshold vth, the base station selects the LTE network for the terminal device; or when a downlink data packet is greater than the threshold vth, the base station selects the 5G network for the terminal device. In a downlink transmission process, an energy efficiency value of the terminal device is not directly related to a data volume value. Therefore, when the serving cell is selected in this manner, energy consumed by the terminal device may also be large.

Based on this, embodiments of this application provide the cell selection method. A base station can select, for a terminal device based on an energy efficiency first request of the terminal device, a cell when energy efficiency is first, to reduce energy consumed by the terminal device during communication.

For example, FIG. 1 is a schematic diagram of a system architecture according to an embodiment of this application. The base station can select, for the terminal device based on the energy efficiency first request of the terminal device, the cell when energy efficiency is first.

The base station in embodiments of this application may also be referred to as a radio access network (radio access network, RAN) device, a network device, or the like. The base station may be a base transceiver station (base transceiver station, BTS) in global system for mobile communications (global system of mobile communications, GSM) or code division multiple access (code division multiple access, CDMA), or may be a NodeB (NodeB, NB) in wideband code division multiple access (wideband code division multiple access, WCDMA), or may be an evolved NodeB (evolutional node B, eNB or eNodeB) in long term evolution (long term evolution, LTE), a relay station or an access point, a base station (which may also be referred to as a gNB) in a 5G network, a base station in a future network, or the like. This is not limited herein.

The terminal device in embodiments of this application may be a wired terminal, or may be a wireless terminal. The wireless terminal may be a device with a wireless transceiver function. The terminal device in embodiments of this application may be deployed on land, including deployed indoors or outdoors, held in hand or deployed in vehicle, may be deployed on water (for example, on a ship), or may be deployed in air (for example, on an air plane, a balloon, or a satellite). The terminal device in embodiments of this application may be user equipment (user equipment, UE). The UE includes a handheld device with a wireless communication function, a vehicle-mounted device, a wearable device, or a computing device. For example, the UE may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self driving, a wireless terminal in telemedicine, a wireless terminal in a smart grid, a wireless terminal in a smart city (smart city), a wireless terminal in a smart home (smart home), or the like. In embodiments of this application, an apparatus for implementing a function of the terminal device may be a terminal device, or may be an apparatus that supports the terminal device in implementing the function.

The terminal device or the base station in embodiments of this application may include a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). An operating system may be any one or more types of computer operating systems that implement service processing through a process (process), for example, a Linux operating system, a Unix operating system, an Android operating system, an iOS operating system, or a Windows operating system. The application layer includes applications such as a browser, contacts, word processing software, and instant messaging software.

In embodiments of this application, an apparatus that performs a method on a terminal device (or referred to as a terminal) side may be a terminal device or an apparatus in the terminal device. For example, the apparatus in the terminal device may be a chip system, a circuit, or a module. This is not limited in this application. It may be understood that a transmit end in embodiments of this application may be the apparatus that performs the method on the terminal device side.

In embodiments of this application, an apparatus that performs a method on a base station side may be a base station, or may be an apparatus in the base station. For example, the apparatus in the base station may be a chip system, a circuit, or a module. This is not limited in this application. It may be understood that a receive end in embodiments of this application may be the apparatus that performs the method on the base station side.

The following describes some terms in embodiments of this application. The descriptions are intended for better understanding of embodiments of this application, and do not constitute an inevitable limitation.

A first request in embodiments of this application may be referred to as an energy efficiency first request or the like. The first request may be in any form such as a character or a number. The first request is used to request to select a serving cell in an energy efficiency first manner. The energy efficiency first manner may be understood as a manner in which the terminal device maintains communication with low power consumption while ensuring communication.

There may be a plurality of trigger conditions for the terminal device in embodiments of this application to send the first request to the network device.

In a possible implementation, the terminal device sends the first request to the network device based on a user configuration. In the manner, it may be understood that the serving cell corresponding to energy efficiency first is selected based on preference of a user of the terminal device and interaction between the terminal device and the network device, to reduce power consumed by the terminal.

Figure 2:
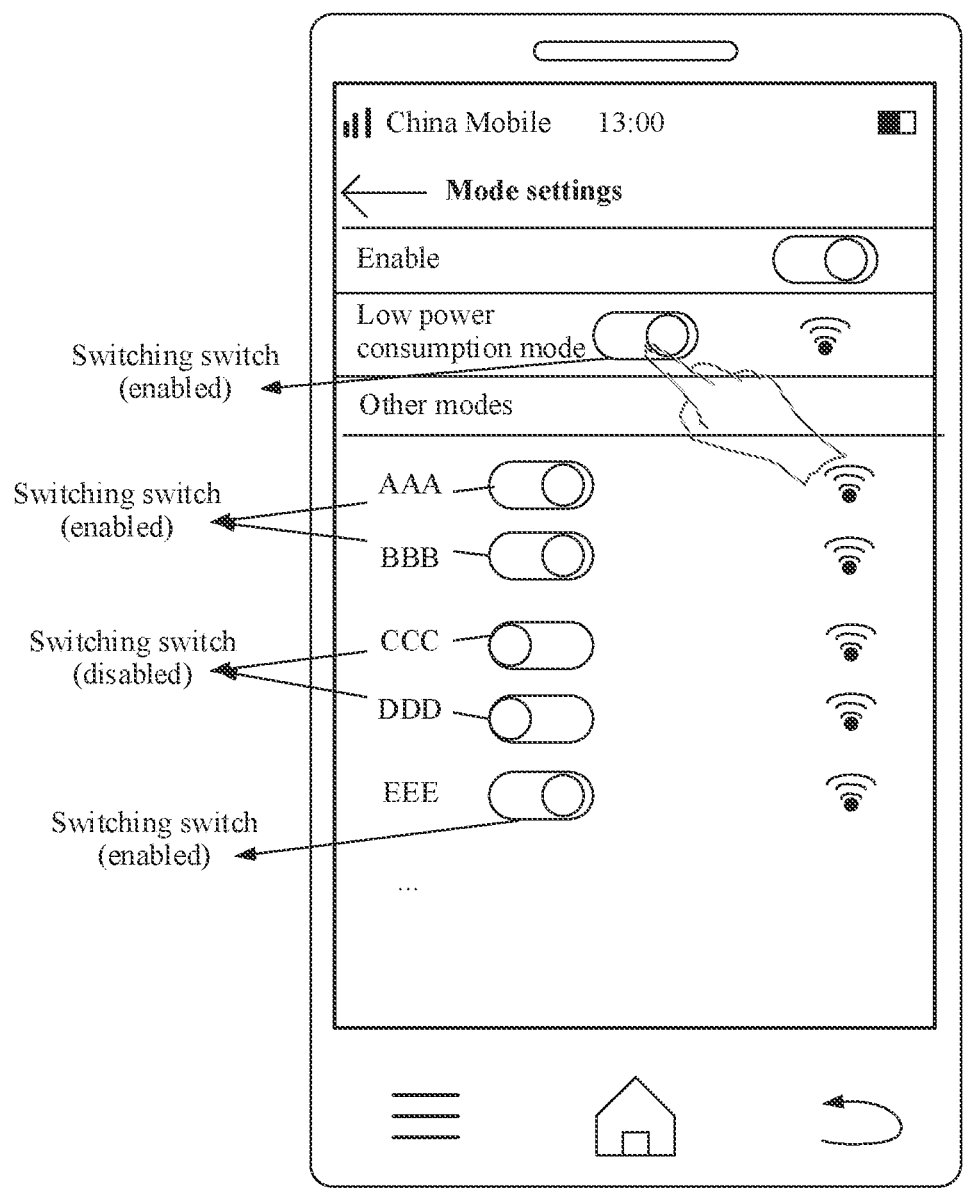
FIG. 2 is a schematic diagram of a user interface according to an embodiment of this application.

For example, FIG. 2 is a schematic diagram of a user interface of the terminal device. As shown in FIG. 2, the user interface may include a plurality of terminal running modes. The user may set the terminal device to a low energy consumption mode (which may also be referred to as an energy efficiency first mode or the like), and the terminal device may send the first request to the network device based on the user configuration. In a possible implementation, the low power consumption mode may be enabled together with some of other modes. For example, AAA, BBB, and EEE that represent the other modes in FIG. 2 may be enabled together with the low power consumption mode. In a possible implementation, the low power consumption mode may not be enabled together with another mode. In this case, when the low power consumption mode is enabled, the another mode may be in a disabled state (not shown in the figure).

In a possible implementation, when the terminal device detects that remaining battery power is lower than a battery power threshold, the terminal device sends the first request to the network device. In the manner, it may be understood that the serving cell corresponding to energy efficiency first is selected based on specific usage of the terminal device and interaction between the terminal device and the network device, to reduce power consumed by the terminal.

In embodiments of this application, the terminal device may periodically or randomly detect the remaining battery power of the terminal device. If the remaining battery power of the terminal device is lower than the battery power threshold, the terminal device may send the first request to the network device. For example, the battery power threshold may be any value between 10% and 50%. This is not specifically limited in embodiments of this application. In a possible implementation, the terminal device may have a function of prompting the user that the battery power is low. The terminal device sends the first request to the network device at the same time (the same time may be within a period of time before and after prompting the user that the battery power is low, and does not specifically refer to a specific moment) in which the terminal device prompts the user that the battery power is low. In the manner, it may be understood that the serving cell corresponding to energy efficiency first is selected based on preference of the user of the terminal device, a specific usage of the terminal device, and interaction between the terminal device and the network device, to reduce power consumed by the terminal.

In a possible implementation, when the terminal device detects that remaining battery power is less than a battery power threshold, the terminal device displays a user interface used to prompt the user to configure energy efficiency first, and the terminal device sends the first request to the network device based on a configuration received from the user interface.

For example, when the terminal device detects that the remaining battery power is less than the battery power threshold, the terminal device may display the user interface shown in FIG. 2, and further receive the user configuration from the user interface. If the user configures the energy efficiency first mode, the terminal device may send the first request to the network device.

Figure 3:
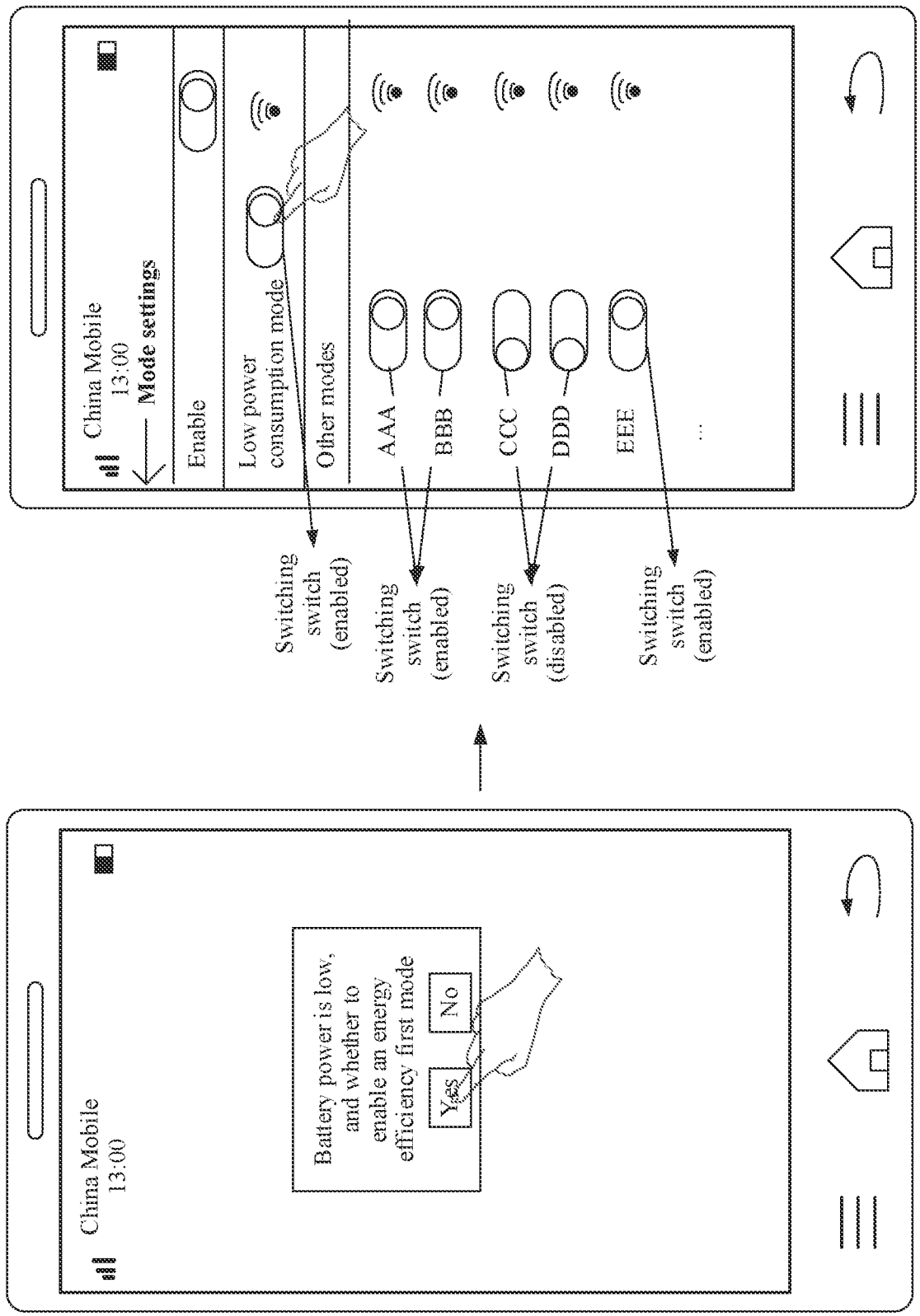
FIG. 3 is a schematic diagram of another user interface according to an embodiment of this application.

For example, when the terminal device detects that the remaining battery power is less than the battery power threshold, as shown in FIG. 3, in the user interface of the terminal device, a pop-up window, a tooltip, or the like may be used to prompt the user that "The battery power is low, and whether to enable the energy efficiency first mode". If the user selects "Yes", the user interface shown in FIG. 2 may be displayed, and further, the user configuration is received from the user interface. If the user configures the energy efficiency first mode, the terminal device may send the first request to the network device. Alternatively, in the user interface of the terminal device, a pop-up window, a tooltip, or the like may be used to prompt the user that "The battery power is low, and whether to enable the energy efficiency first mode". If the user selects "Yes", the terminal device may send the first request to the network device based on a user selection. In the user interface of the terminal device, a pop-up window, a tooltip, or the like is used to prompt the user that "The battery power is low, and whether to enable the energy efficiency first mode". If the user selects "No", the terminal device may not send the first request to the network device. This is not specifically limited in embodiments of this application.

A first communications system in embodiments of this application may be an LTE system, a 5G system, a future mobile communications system, or the like. A second communications system may be an LTE system, a 5G system, a future mobile communications system, or the like. The first communications system and the second communications system have different communications standards, for example, the first communications system is an LTE system, and the second communications system is a 5G system; or the first communications system is a 5G system, and the second communications system is an LTE system. For ease of description, in subsequent embodiments, an example in which the first communications system is an LTE system and the second communications system is a 5G system may be used for description. The description is not intended to limit embodiments of this application.

First information in embodiments of this application may be information used by the network device to select a serving cell (for example, a cell in an LTE system or a cell in a 5G system) for the terminal device.

In a possible implementation, the first information may include a communications system selection parameter when energy efficiency of the terminal device is first, and transmit power when energy efficiency of the terminal device is first. In the implementation, after the terminal device sends the first request to the network device, the network device may send bandwidth ranges (which may also be referred to as bandwidth intervals, available bandwidth ranges, available bandwidth intervals, or the like) of a plurality of communications systems to the terminal device. The terminal device may calculate, based on the bandwidth ranges of the plurality of communications systems, the communications system selection parameter when energy efficiency of the terminal device is first and the transmit power w % ben energy efficiency of the terminal device is first (the transmit power may be lower than maximum transmit power of the terminal device), and send the communications system selection parameter and the transmit power to the network device. Further, the network device may select the serving cell for the terminal device based on the communications system selection parameter, further perform power control based on the transmit power, and allocate and deliver a communication resource. For example, when the base station performs uplink power control, power adjustment performed on the terminal device does not exceed the transmit power.

For example, the terminal device receives a first bandwidth range and a second bandwidth range from the network device. The first bandwidth range is used to indicate an available bandwidth range of the first communications system. The second bandwidth range is used to indicate an available bandwidth range of the second communications system. The first bandwidth range may be determined by the network device based on a load status of the first communications system. The second bandwidth range may be determined by the network device based on a load status of the second communications system. For example, because maximum available bandwidth of the LTE system is usually 20 M, maximum available bandwidth of the 5G system on a sub-6G frequency band is usually 100 M, and a quantity of users in each communications system is also different, in a current state of the terminal device, an available LTE bandwidth resource may be different from a 5G bandwidth resource, and a value of the bandwidth affects energy consumption of the terminal device. Therefore, the terminal device may calculate energy efficiency of the terminal device by using available bandwidth information, and select a communications system when energy efficiency is first.

In a communications system, there is a mapping relationship between a bandwidth range and a quantity of physical resource blocks. When the bandwidth range is specified, physical resource block data may be obtained based on the bandwidth range. Therefore, the terminal device may determine a quantity of physical resource blocks of the first communications system and a quantity of physical resource blocks of the second communications system based on the first bandwidth range and the second bandwidth range.

The terminal device may determine, in a manner of performing calculation based on a local policy or subscription data, performing obtaining from the network device, or the like, total uplink power of the first communications system, an uplink rate of the first communications system, a modulation and coding scheme of the first communications system, total uplink power of the second communications system, an uplink rate of the second communications system and a modulation and coding scheme of the second communications system. For example, total uplink power may include three parts, transmit power, radio frequency power, and baseband power. For example, the transmit power is related to channel magnitude scale fading, a quantity of used RBs, an MCS index, and an antenna gain of the base station and the terminal device.

Therefore, the terminal device may calculate, based on the total uplink power of the first communications system, the uplink rate of the first communications system, the quantity of the physical resource blocks of the first communications system, the modulation and coding scheme of the first communications system, the total uplink power of the second communications system, the uplink rate of the second communications system, the quantity of the physical resource blocks of the second communications system, and the modulation and coding scheme of the second communications system, the communications system selection parameter when energy efficiency of the terminal device is first.

For example, that the terminal device calculates the communications system selection parameter when energy efficiency of the terminal device is first meets the following formula:

$$\max_{Q,W,MCS} Q \frac{v_1(RB_1, MCS_1)}{P_1} + (1-Q)\frac{v_2(RB_2, MCS_2)}{P_2},$$

Q is the communications system selection parameter, $P_1$ is the total uplink power of the first communications system, $v_1$ is the uplink rate of the first communications system, $RB_1$ is the quantity of the physical resource blocks of the first communications system. $MCS_1$ is the modulation and coding scheme of the first communications system, $P_2$ is the total uplink power of the second communications system, $v_2$ is the uplink rate of the second communications system, $RB_2$ is the quantity of the physical resource blocks of the second communications system, and $MCS_2$ is the modulation and coding scheme of the second communications system.

For example, the first bandwidth range is w1 and the second bandwidth range is w2, $RB_1 \in w1$, $RB_2 \in w2$. An optimal solution (Q*, RB*, MCS*) may be obtained by using the foregoing formula, and Q* is determined as the communications system selection parameter when energy efficiency of the terminal device is first. For example, when Q* is 1, it indicates that the first communications system is selected, and when Q* is 0, it indicates that the second communications system is selected.

In a possible implementation, the first information may include a rate threshold. In the implementation, after the terminal device sends the first request to the network device, the terminal device may further report the rate threshold. The rate threshold may be a downlink rate threshold of the terminal device when energy efficiency is first. Further, the network device may select the serving cell for the terminal device based on the rate threshold and a downlink rate of a current task.

For example, the terminal device may further determine basic consumed power of the terminal device in the first communications system and basic consumed power of the terminal device in the second communications system based on local data, or in a manner of performing obtaining from a network end, or the like. The basic power consumption is possibly understood as basic power consumed by the terminal to access the communications system. The basic power consumption may be related to performance of the terminal device, for example, may mainly include radio frequency power consumption and baseband power consumption. The basic power consumption is relatively fixed. An average value can be obtained through pre-test and used as a constant. For example, basic consumed power for the terminal device to access the 5G communications system is usually greater than basic consumed power for the terminal device to access the LTE communications system.

The first information sent by the terminal device to the network device further includes first power and second power. The first power is the basic consumed power of the terminal device in the first communications system. The second power is the basic consumed power of the terminal device in the second communications system. The first power is less than the second power. The serving cell is specifically selected by the network device based on the downlink rate of the current task, the rate threshold, the first power, and the second power.

For example, when the downlink rate of the current task is less than or equal to the rate threshold, the serving cell is a cell in the first communications system. The basic power consumption of the terminal device in the first communications system is greater than the basic power consumption of the terminal device in the second communications system Therefore, when the downlink rate is low, energy efficiency of the second communications system is extremely low, selecting the first communications system helps improve energy efficiency of the terminal device.

For example, when the downlink rate of the current task is greater than the rate threshold, because the downlink rate of the current task is high, more communication resources are required. In this case, factors such as a network status affect resource configuration of the network device, and further affect downlink energy efficiency of the terminal device. Therefore, energy efficiency of the first communications system and energy efficiency of the second communications system need to be balanced according to an energy efficiency first method, to select a serving cell in a communications system with better energy efficiency. Selecting of the serving cell meets the following formula;

$$\max_{x,W,MCS} x \frac{v_3(RB_3, MCS_3)}{P_3} + (1-x)\frac{v_4(RB_4, MCS_4)}{P_4},$$

x is a discrete binary function of 0 or 1 (for example, when x is 1, it indicates that the first communications system is selected, and when x is 0, it indicates that the second communications system is selected), $P_3$ is the first power, $v_3$ is a downlink rate of the first communications system, $RB_3$ is a quantity of physical resource blocks of the first communications system. $MCS_3$ is a modulation and coding scheme of the first communications system, $P_4$ is the second power, $v_4$ is a downlink rate of the second communications system, $RB_4$ is a quantity of physical resource blocks of the second communications system, and $MCS_4$ is a modulation and coding scheme of the second communications system.

For example, the first bandwidth range is w3 and the second bandwidth range is w3, $RB_3 \in w3$, $RB_4 \in w4$. An optimal solution (x*, RB*, MCS*) may be obtained by using the foregoing formula, and x* is determined as the communications system selection parameter when energy efficiency of the terminal device is first. For example, when x* is 1, it indicates that the first communications system is selected, and when x* is 0, it indicates that the second communications system is selected.

In a possible implementation, when the downlink rate of the current task is equal to the rate threshold, the serving cell may be selected by using the foregoing formula. The case in which the downlink rate of the current task is equal to the rate threshold is not specifically limited in embodiments of this application.

Data transmission in embodiments of this application may include a process of data sending, data receiving, or data exchange. For example, data transmission performed between the terminal device and the base station may include that the terminal device sends data to the base station, or the base station sends data to the terminal device, or the terminal device sends data to the base station and receives data from the base station, or the base station sends data to the terminal device and receives data from the terminal device.

Specific embodiments are used below to describe in detail the technical solutions of this application and how to resolve the foregoing technical problems by using the technical solutions of this application. The several specific embodiments below may be implemented independently or combined with each other, and same or similar concepts or processes may not be repeatedly described in some embodiments.

Figure 4:
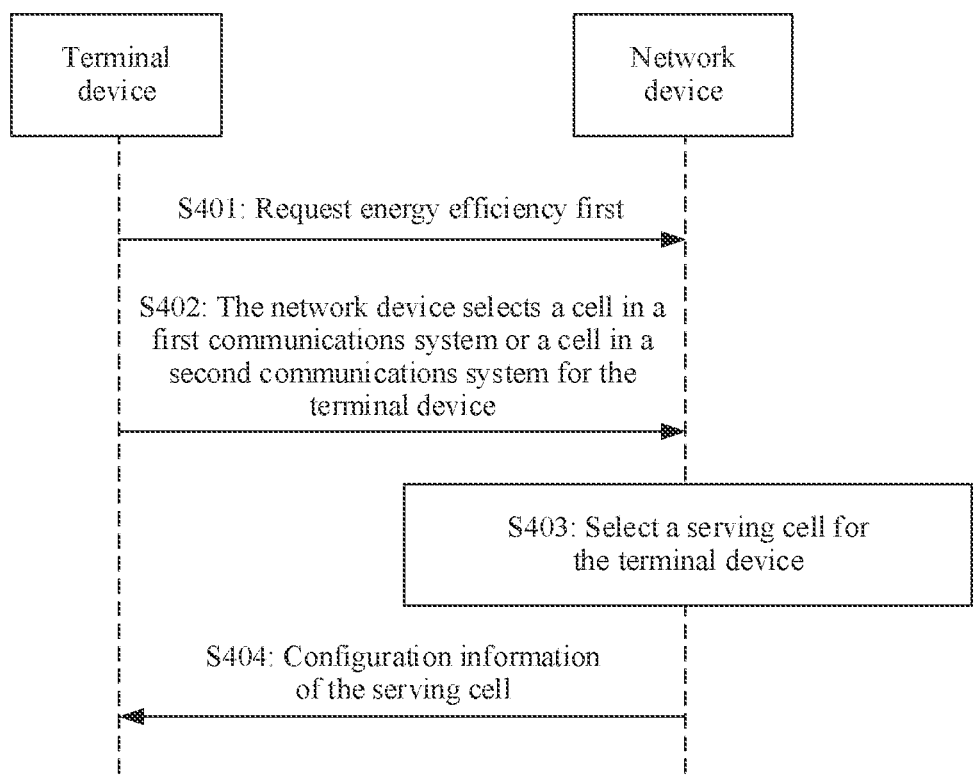
FIG. 4 is a schematic flowchart of a cell selection method according to an embodiment of this application.

FIG. 4 is a schematic flowchart of a cell selection method according to Embodiment 1 of this application. As shown in FIG. 4, the method includes the following steps.

S401: A terminal device sends a first request to a network device, where the first request is used to request to select a serving cell for the terminal device in an energy efficiency first manner.

In this embodiment of this application, the terminal device may send the first request to the network device in any possible communication manner. For implementation of triggering sending of the first request, refer to the descriptions in the foregoing explanations. Details are not described herein again.

S402: The terminal device sends first information to the network device, where the first information is used by the network device to select a cell in a first communications system or a cell in a second communications system for the terminal device.

In this embodiment of this application, the terminal device may synchronously or asynchronously send the first request and the first information. For a specific possible manner of the first information, refer to the descriptions in the foregoing explanations. Details are not described herein again.

In a possible implementation, after the terminal device sends the first request to the network device, the network device may reply a message indicating whether to accept the first request of the terminal device. When the terminal device receives the message that the network device accepts the first request of the terminal device, the terminal device sends the first information to the network device.

S403: The network device selects a serving cell for the terminal device based on the first request and the first information.

In this embodiment of this application, the network device may select the serving cell for the terminal device based on a specific network status, an energy efficiency first request of the terminal device, the first information, and the like.

S404: The terminal device receives configuration information of the serving cell from the network device.

In this embodiment of this application, the terminal device receives the configuration information of the serving cell from the network device, may be handed over to the serving cell based on the configuration information, and perform data transmission, so as to implement communication with low power consumption.

In conclusion, a base station can select, for the terminal device based on the energy efficiency first request of the terminal device, the cell when energy efficiency is first, to reduce energy consumed by the terminal device during communication.

Figure 5:
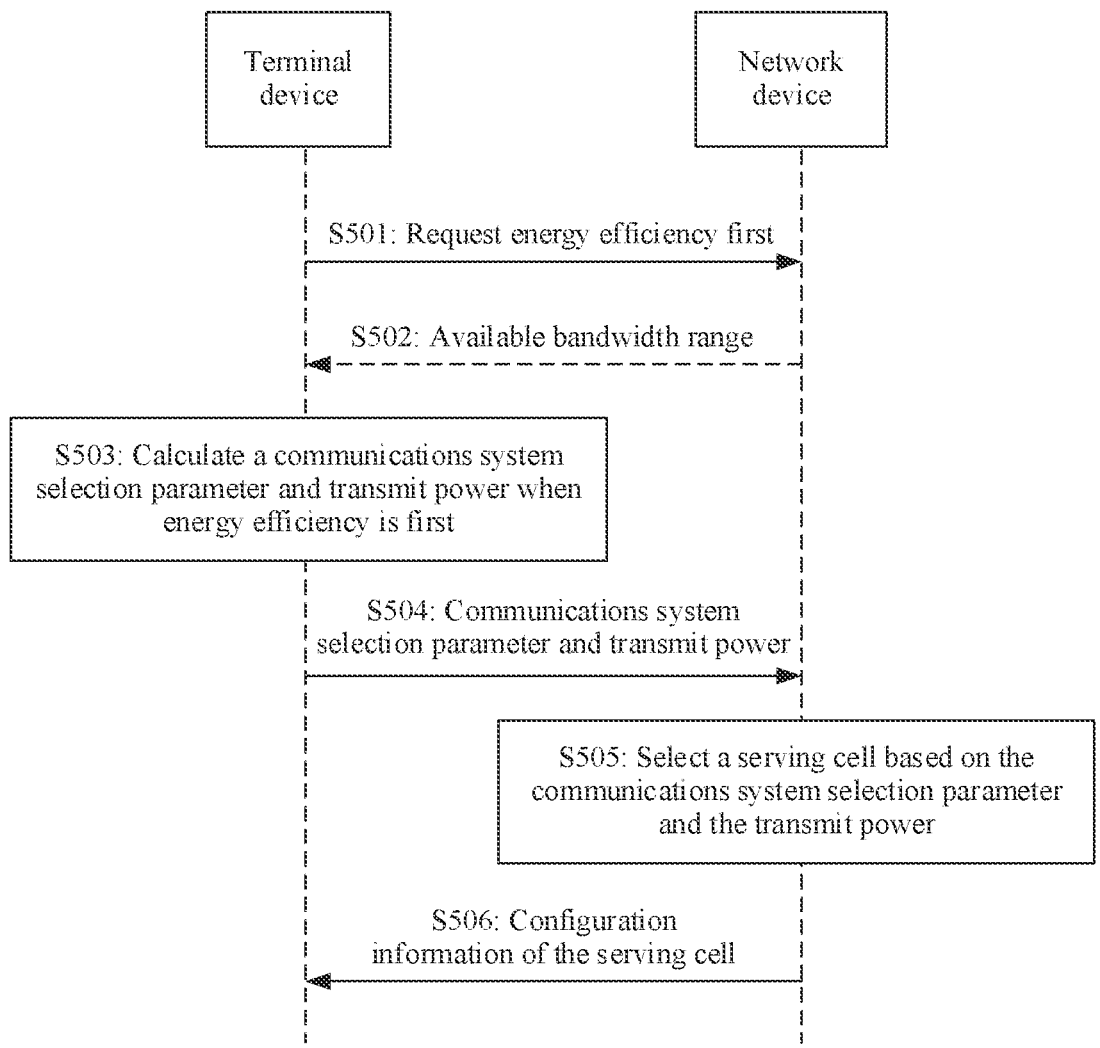
FIG. 5 is a schematic flowchart of another cell selection method according to an embodiment of this application.

FIG. 5 is a schematic flowchart of a specific cell selection method according to Embodiment 1 of this application. This embodiment may be a specific implementation during uplink transmission. As shown in FIG. 5, the method includes the following steps.

S501: A terminal device sends a first request to a network device, where the first request is used to request to select a serving cell for the terminal device in an energy efficiency first manner.

S502: The terminal device receives a first bandwidth range and a second bandwidth range from the network device, where the first bandwidth range is used to indicate an available bandwidth range of a first communications system, and the second bandwidth range is used to indicate an available bandwidth range of a second communications system.

S503: The terminal device calculates, based on the first bandwidth range and the second bandwidth range, a communications system selection parameter when energy efficiency of the terminal device is first, and transmit power when energy efficiency of the terminal device is first.

S504: The terminal device sends first information to the network device, where the first information includes the communications system selection parameter when energy efficiency of the terminal device is first, and the transmit power when energy efficiency of the terminal device is first.

S505: The network device selects a serving cell based on the communications system selection parameter and the transmit power, where uplink transmit power of the terminal device is not greater than the transmit power in the serving cell.

S506: The terminal device receives configuration information of the serving cell from the network device.

In this embodiment of this application, for S501 to S506, refer to the descriptions in the foregoing explanations and embodiments. Details are not described herein again. In this embodiment of this application, the terminal device can calculate, based on the available bandwidth range sent by the network device, the communications system selection parameter when energy efficiency is first and the transmit power when energy efficiency is first. Further, the network device can select, for the terminal device based on the communications system selection parameter and the transmit power that are sent by the terminal device, the serving cell when energy efficiency is first, and implement a resource configuration in the energy efficiency first manner, to reduce energy consumed by the terminal device during communication.

In a possible implementation, in the embodiment corresponding to FIG. 5, if the network device determines, when receiving the first request, that available bandwidth of either the first communications system or the second communications system is very small due to reasons such as network congestion or extremely poor channel quality, the network device may select, for the terminal device, a serving cell in a communications system with larger available bandwidth, to ensure normal communication of the terminal device.

Figure 6:
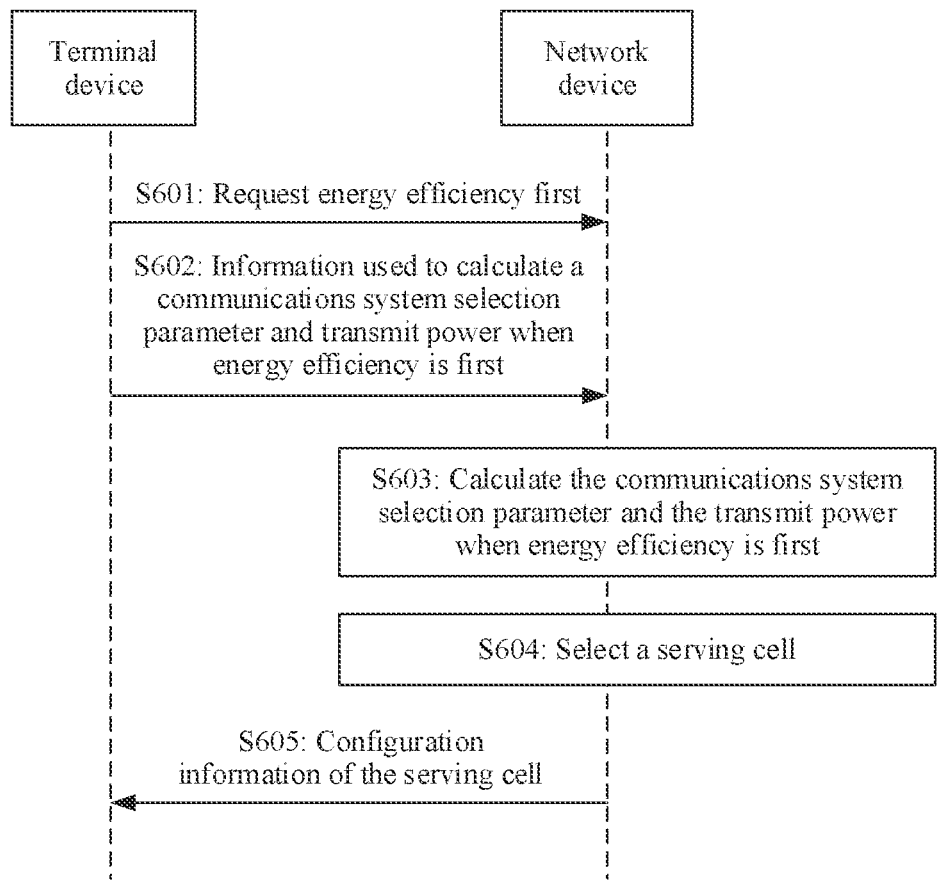
FIG. 6 is a schematic flowchart of still another cell selection method according to an embodiment of this application.

FIG. 6 is a schematic flowchart of a specific cell selection method according to Embodiment 1 of this application. This embodiment may be a specific implementation during uplink transmission. As shown in FIG. 6, the method includes the following steps.

S601: A terminal device sends a first request to a network device, where the first request is used to request to select a serving cell for the terminal device in an energy efficiency first manner.

S602: The terminal device sends, to the network device, information that is used to calculate a communications system selection parameter and transmit power when energy efficiency of the terminal device is first.

S603: The network device calculates, based on the information sent by the terminal device, the communications system selection parameter when energy efficiency of the terminal device is first, and the transmit power when energy efficiency of the terminal device is first.

S604: The network device selects a serving cell based on the communications system selection parameter and the transmit power, where uplink transmit power of the terminal device is not greater than the transmit power in the serving cell.

S605: The terminal device receives configuration information of the serving cell from the network device.

In this embodiment of this application, difference from S501 to S506 is as follows: The step of calculating the communications system selection parameter and the transmit power when energy efficiency of the terminal device is first is implemented by the network device, and this further reduces calculation load of the terminal device. The adaptive terminal device needs to send, to the network device, the information that is used to calculate the communications system selection parameter and the transmit power when energy efficiency of the terminal device is first. The network device may not send a first bandwidth range and a second bandwidth range to the terminal device. For the information that is used to calculate the communications system selection parameter and the transmit power when energy efficiency of the terminal device is first, refer to the description in the foregoing explanations. For example, the information that is used to calculate the communications system selection parameter and the transmit power when energy efficiency of the terminal device is first may include: total uplink power of a first communications system, an uplink rate of the first communications system, a modulation and coding scheme of the first communications system, total uplink power of a second communications system, an uplink rate of the second communications system, a modulation and coding scheme of the second communications system, and the like. Details are not described herein again.

In this embodiment of this application, the terminal device sends, to the network device, the request used to request energy efficiency first, and the information that is used to calculate the communications system selection parameter and the transmit power when energy efficiency of the terminal device is first. The network device calculates the communications system selection parameter when energy efficiency is first and the transmit power when energy efficiency is first. Further, the network device can select, for the terminal device based on the communications system selection parameter and the transmit power, the serving cell when energy efficiency is first, and implement a resource configuration in the energy efficiency first manner, to reduce energy consumed by the terminal device during communication.

Figure 7:
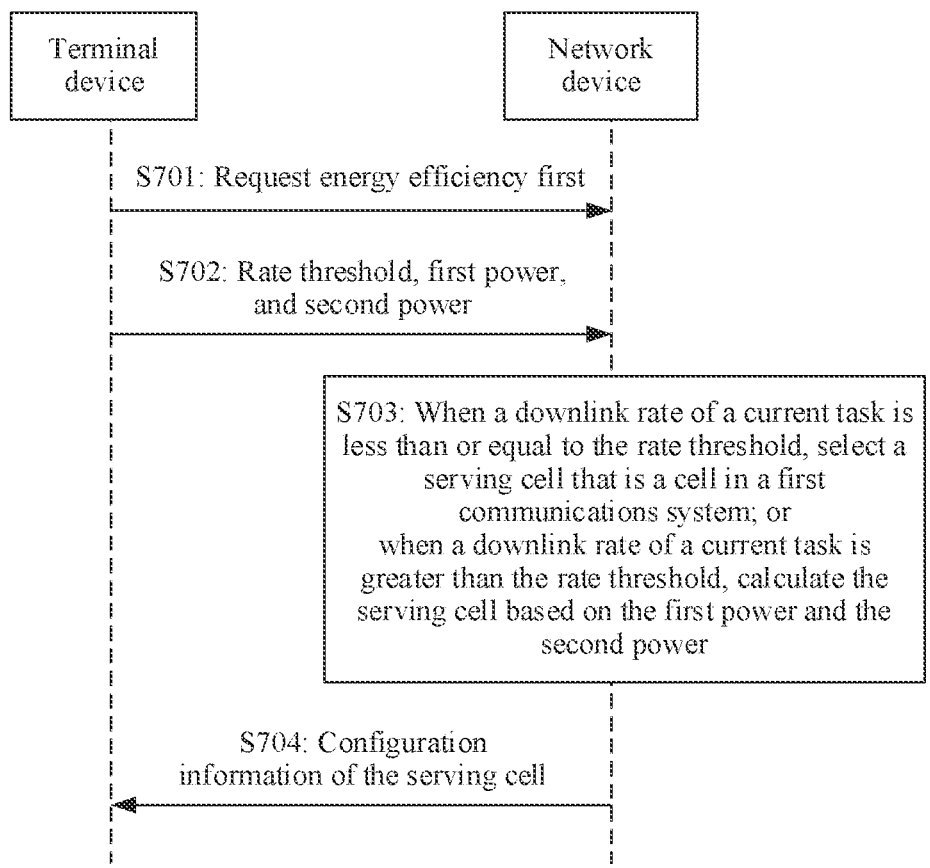
FIG. 7 is a schematic flowchart of yet another cell selection method according to an embodiment of this application.

FIG. 7 is a schematic flowchart of a specific cell selection method according to Embodiment 1 of this application. This embodiment may be a specific implementation during downlink transmission. As shown in FIG. 7, the method includes the following steps.

S701: A terminal device sends a first request to a network device, where the first request is used to request to select a serving cell for the terminal device in an energy efficiency first manner.

S702: The terminal device sends a rate threshold, first power, and second power to the network device, where the first power is basic consumed power of the terminal device in a first communications system, the second power is basic consumed power of the terminal device in a second communications system, and the first power is less than the second power.

S703: The network device selects a serving cell for the terminal device, where when a downlink rate of a current task is less than or equal to the rate threshold, the network device selects the serving cell that is a cell in the first communications system; or when a downlink rate of a current task is greater than the rate threshold, the network device calculates the serving cell based on the first power and the second power.

S704: The terminal device receives configuration information of the serving cell from the network device.

In this embodiment of this application, for S701 to S704, refer to the descriptions in the foregoing explanations and embodiments. Details are not described herein again. In this embodiment of this application, the terminal device sends, to the network device, the request used to request energy efficiency first, the rate threshold, the first power, and the second power. The network device can select, for the terminal device based on a status of a communications system, the serving cell when energy efficiency is first, and implement a resource configuration in the energy efficiency first manner, to reduce energy consumed by the terminal device during communication.

In a possible implementation, in the embodiment corresponding to FIG. 7, if the network device determines, when receiving the first request, that available bandwidth of either the first communications system or the second communications system is very small due to reasons such as network congestion or extremely poor channel quality, the network device can select, for the terminal device, a serving cell in a communications system with larger available bandwidth, to ensure normal communication of the terminal device.

The foregoing describes the methods in embodiments of this application with reference to FIG. 4 to FIG. 7. The following describes apparatuses that are provided in embodiments of this application and that perform the foregoing methods. A person skilled in the art may understand that the method and the apparatus may be mutually combined and referenced. A cell selection apparatus provided in an embodiment of this application may perform the steps performed by the terminal device in the foregoing cell selection methods. Another cell selection apparatus may perform the steps performed by the network device in the cell selection methods in the foregoing embodiments.

Descriptions are provided below by using an example in which each function module is obtained through division based on each corresponding function.

Figure 8:
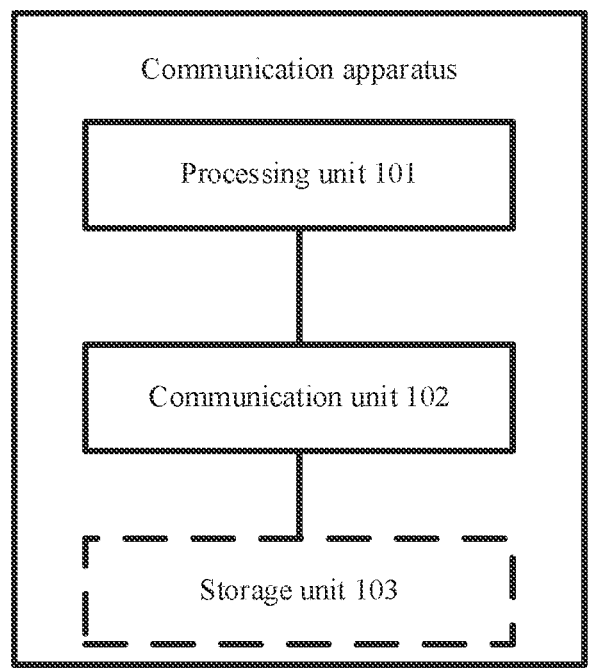
FIG. 8 is a schematic diagram of a structure of a cell selection apparatus according to an embodiment of this application.

FIG. 8 is a schematic diagram of a structure of a cell selection apparatus according to an embodiment of this application. The cell selection apparatus may be the terminal device and the network device in embodiments of this application, or may be a chip applied to the terminal device and the network device. The cell selection apparatus includes a processing unit 101 and a communication unit 102. The communication unit 102 is configured to support the cell selection apparatus in performing a step of sending or receiving information. The processing unit 101 is configured to support the cell selection apparatus in performing a step of processing information.

For example, the cell selection apparatus is the terminal device or a chip or the chip system applied to the terminal device. The communication unit 102 is configured to support the cell selection apparatus in performing S401, S402, and S404 in the foregoing embodiment, or performing S501, S502, S504, and S506 in the foregoing embodiment, or performing S601, S602, and S605 in the foregoing embodiment, or performing S701, S702, and S704 in the foregoing embodiment, or the like. The processing unit 101 is configured to support the cell selection apparatus in performing S503 in the foregoing embodiment, and the like.

For another example, the cell selection apparatus is the network device or the chip or a chip system applied to the network device. The processing unit 101 is configured to support the cell selection apparatus in performing S403 in the foregoing embodiment, or performing S505 in the foregoing embodiment, or performing S603 and S604 in the foregoing embodiment, or performing S703 in the foregoing embodiment, or the like. The communication unit 102 is configured to support the cell selection apparatus in performing S401, S402, and S404 in the foregoing embodiment, or performing S501, S502, S504, and S506 in the foregoing embodiment, or performing S601, S602, and S605 in the foregoing embodiment, or performing S701, S702, S704 in the foregoing embodiment, or the like.

In a possible embodiment, the cell selection apparatus may further include a storage unit 103. The processing unit 101, the communication unit 102, and the storage unit 103 are connected through a communication bus.

The storage unit 103 may include one or more memories. The memory may be a component that is configured to store a program or data and that is in one or more devices or circuits.

The storage unit 103 may exist independently, and is connected to the processing unit 101 of the cell selection apparatus through a communications bus. The storage unit 103 may alternatively be integrated with the processing unit.

The cell selection apparatus may be used in a communications device, a circuit, a hardware component, or a chip.

For example, the cell selection apparatus may be a chip or a chip system of the terminal device or the network device in embodiments of this application. The communication unit 102 may be an input or output interface, a pin, a circuit, or the like. For example, the storage unit 103 may store computer-executable instructions of a method on a terminal device side or a network device side, so that the processing unit 101 performs the method on the terminal device or the network device in the foregoing embodiments. The storage unit 103 may be a register, a cache, a RAM, or the like. The storage unit 103 may be integrated with the processing unit 101. The storage unit 103 may be a ROM or another type of static storage device that can store static information and an instruction, and the storage unit 103 may be independent of the processing unit 101.

An embodiment of this application provides a cell selection apparatus. The cell selection apparatus includes one or more modules, configured to implement the method in any one of the corresponding embodiments in the foregoing FIG. 4 to FIG. 7. The one or more modules may correspond to the steps of the method in any one of the corresponding embodiments in the foregoing FIG. 4 to FIG. 7. Specifically, in embodiments of this application, for each step in the method performed by the terminal device, the terminal device includes units or modules for performing each step in the method. For each step in the method performed by the network device, the network device includes units or modules for performing each step in the method. For example, a module that controls or processes an action of the cell selection apparatus may be referred to as a processing module. A module that performs a step of performing message or data processing on a cell selection apparatus side may be referred to as a communications module.

Figure 9:
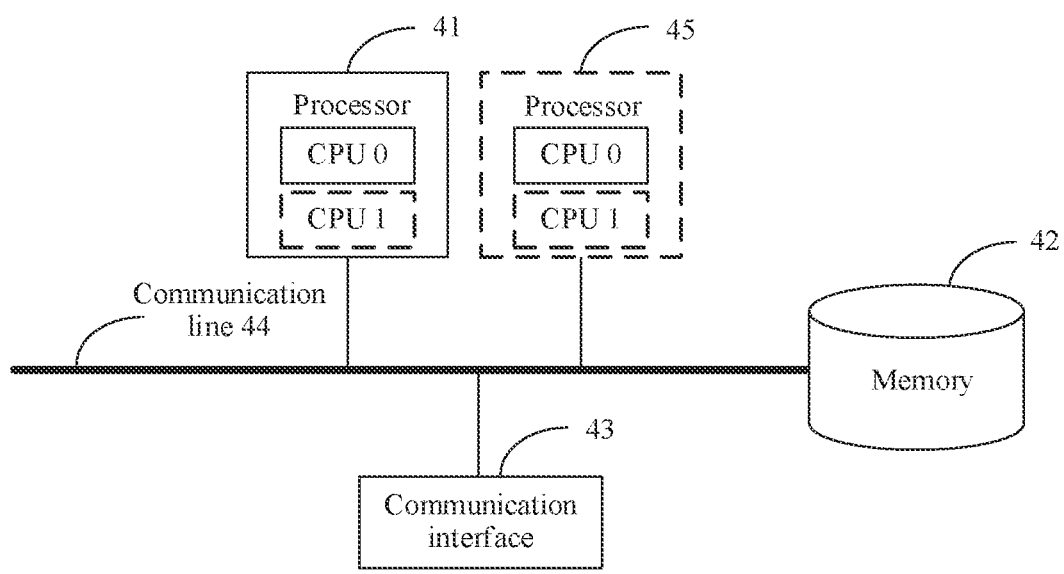
FIG. 9 is a schematic diagram of a structure of a cell selection device according to an embodiment of this application.

FIG. 9 is a schematic diagram of a hardware structure of a cell selection device according to an embodiment of this application. For hardware structures of the terminal device and the network device in embodiments of this application, refer to the schematic diagram of the hardware structure of the cell selection device shown in FIG. 9. The cell selection device includes a processor 41, a communication line 44, and at least one communication interface (in FIG. 9, a communication interface 43 is used as an example for description).

The processor 41 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 44 may include a path for transmitting information between the foregoing components.

The communication interface 43 uses any apparatus such as a transceiver, and is configured to communicate with another device or a communication network such as the Ethernet, a radio access network (radio access network, RAN), or a wireless local area network (wireless local area network, WLAN).

Possibly, the communication device may further include a memory 42.

The memory 42 may be a read-only memory (read-only memory, ROM) or another type of static storage device that can store static information and an instruction, or a random access memory (random access memory. RAM) or another type of dynamic storage device that can store information and an instruction, or may be an electrically erasable programmable read-only memory (electrically erasable programmable read-only memory, EEPROM), a compact disc read-only memory (compact disc read-only memory. CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this is not limited thereto. The memory may exist independently, and is connected to the processor through the communication line 44. The memory may alternatively be integrated with the processor.

The memory 42 is configured to store computer-executable instructions for executing the solutions of this application, and the processor 41 controls the execution. The processor 41 is configured to execute the computer-executable instructions stored in the memory 42, to implement the cell selection method provided in the following embodiments of this application.

Possibly, the computer-executable instructions in this embodiment of this application may also be referred to as application program code. This is not specifically limited in this embodiment of this application.

During specific implementation, in an embodiment, the processor 41 may include one or more CPUs, for example, a CPU 0 and a CPU 1 in FIG. 9.

During specific implementation, in an embodiment, the cell selection device may include a plurality of processors, such as the processor 41 and a processor 45 in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

For example, the cell selection apparatus is the terminal device or the chip applied to the terminal device. The communication interface is used to support the cell selection apparatus in performing S401, S402, and S404 in the foregoing embodiment, or performing S501, S502, S504, and S506 in the foregoing embodiment, or performing S601, S602, and S605 in the foregoing embodiment, or performing S701, S702, and S704 in the foregoing embodiment, or the like. The processor 41 or the processor 45 is configured to support the cell selection apparatus in performing S503 in the foregoing embodiment, and the like.

For another example, the cell selection apparatus may be the network device or the chip or a chip system applied to the network device. The communication interface is used to support the cell selection apparatus in performing S401, S402, and S404 in the foregoing embodiment, or performing S501, S502, S504, and S506 in the foregoing embodiment, or performing S601, S602, and S605 in the foregoing embodiment, or performing S701, S702, and S704 in the foregoing embodiment, or the like. The processor 41 or the processor 45 is configured to support the cell selection apparatus in performing S403 in the foregoing embodiment, or performing S505 in the foregoing embodiment, or performing S603 and S604 in the foregoing embodiment, or performing S703 in the foregoing embodiment, or the like.

Figure 10:
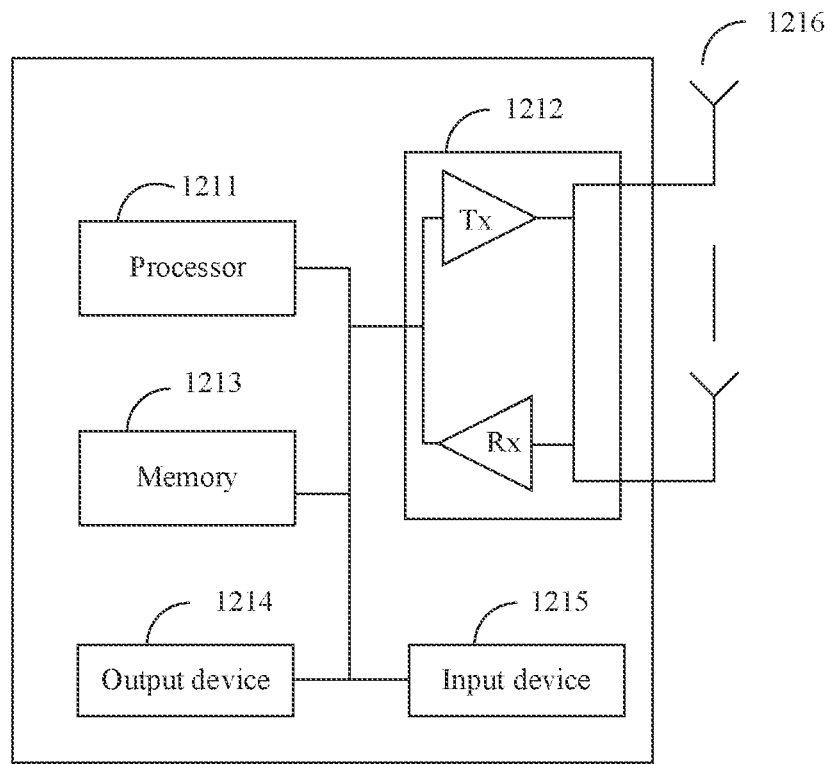
FIG. 10 is a schematic diagram of a structure of a terminal device according to an embodiment of this application.

FIG. 10 is a schematic diagram of a structure of a terminal device (hereinafter referred to as a terminal for short) according to an embodiment of this application.

The terminal includes at least one processor 1211 and at least one transceiver 1212. In a possible example, the terminal may further include at least one memory 1213, an output device 1214, an input device 1215, and one or more antennas 1216. The processor 1211, the memory 1213, and the transceiver 1212 are connected to each other. The antenna 1216 is connected to the transceiver 1212, and the output device 1214 and the input device 1215 are connected to the processor 1211.

A memory in this embodiment of this application, such as the memory 1213, may include at least one of the following types: a read-only memory (read-only memory, ROM) or another type of static storage device that can store static information and an instruction, a random access memory (random access memory, RAM) or another type of dynamic storage device that can store information and an instruction, and an electrically erasable programmable read-only memory (electrically erasable programmable-only memory, EEPROM). In some scenarios, the memory may alternatively be a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed to a computer. However, the memory is not limited thereto.

The memory 1213 may exist independently, and is connected to the processor 1211. In another example, the memory 1213 may be integrated with the processor 1211, for example, be integrated into a chip. The memory 1213 can store program code for executing the technical solutions in embodiments of this application, and the processor 1211 controls the execution. Various types of executed computer program code may also be considered as drivers of the processor 1211. For example, the processor 1211 is configured to execute the computer program code stored in the memory 1213, to implement the technical solutions in embodiments of this application.

The transceiver 1212 may be configured to support receiving or sending of a radio frequency signal between terminals or between a terminal and an access device, and the transceiver 1212 may be connected to the antenna 1216. The transceiver 1212 includes a transmitter Tx and a receiver Rx. Specifically, the one or more antennas 1216 may receive a radio frequency signal. The receiver Rx of the transceiver 1212 is configured to receive a radio frequency signal from the antenna, convert the radio frequency signal into a digital baseband signal or a digital intermediate frequency signal, and provide the digital baseband signal or the digital intermediate frequency signal to the processor 1211, so that the processor 1211 performs further processing, for example, demodulation processing and decoding processing, on the digital baseband signal or the digital intermediate frequency signal. In addition, the transmitter Tx in the transceiver 1212 is further configured to: receive a modulated digital baseband signal or digital intermediate frequency signal from the processor 1211, convert the modulated digital baseband signal or digital intermediate frequency signal into a radio frequency signal, and send the radio frequency signal through the one or more antennas 1216. Specifically, the receiver Rx may selectively perform one-level or multi-level down-conversion mixing and analog-to-digital conversion on the radio frequency signal, to obtain the digital baseband signal or the digital intermediate frequency signal. A sequence of the down-conversion mixing and the analog-to-digital conversion may be adjusted. The transmitter Tx may selectively perform one-level or multi-level up-conversion mixing and digital-to-analog conversion on the modulated digital baseband signal or the modulated digital intermediate frequency signal, to obtain the radio frequency signal. A sequence of the up-conversion mixing and the digital-to-analog conversion may be adjusted. The digital baseband signal and the digital intermediate frequency signal may be collectively referred to as digital signals.

The processor 1211 may be a baseband processor, or may be a CPU. The baseband processor and the CPU may be integrated or separated.

The processor 1211 may be configured to implement various functions for the terminal, for example, configured to process a communications protocol and communication data, or configured to control the entire terminal device, execute a software program, and process data of a software program. Alternatively, the processor 1211 is configured to assist in completing a calculating processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (Liquid Crystal Display, LCD), a light emitting diode (Light Emitting Diode, LED) display device, a cathode ray tube (Cathode Ray Tube, CRT) display device, or a projector (projector). The input device 1215 communicates with the processor 1211, and may receive an input of a user in a plurality of manners. For example, the input device 1215 may be a mouse, a keyboard, a touchscreen device, or a sensing device.

Specifically, the at least one processor 1211 is configured to perform Step 104. The at least one transceiver 1212 is configured to perform Step 103. In a possible example, the transceiver 1212 is further configured to perform Step 116 and Step 117.

Figure 11:
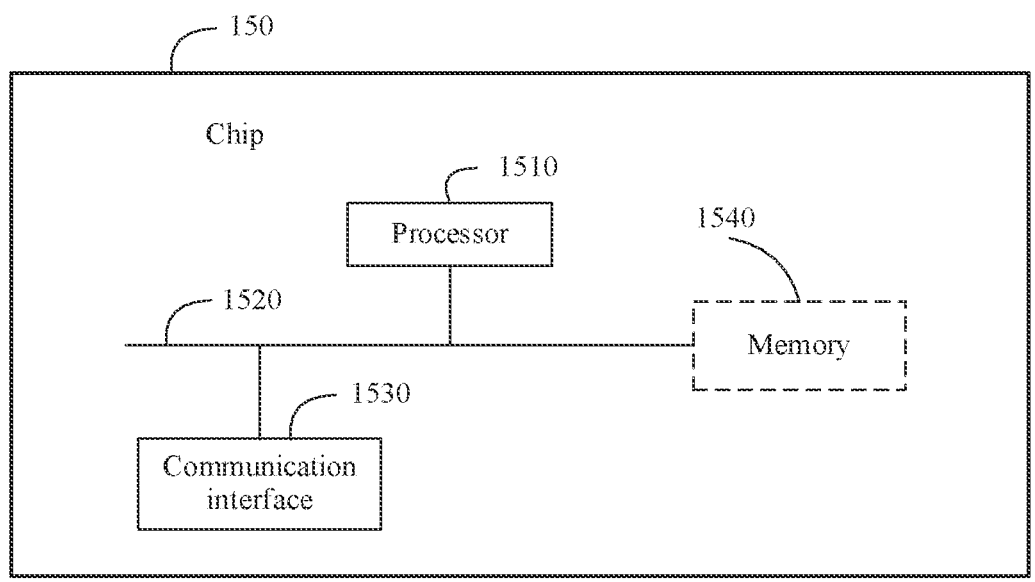
FIG. 11 is a schematic diagram of a structure of a chip according to an embodiment of this application.

FIG. 11 is a schematic diagram of a structure of a chip 150 according to an embodiment of the present invention. The chip 150 includes one or more (including two) processors 1510 and a communication interface 1530.

In a possible embodiment, the chip 150 shown in FIG. 11 further includes a memory 1540. The memory 1540 may include a read-only memory and a random access memory, and provide an operation instruction and data for the processor 1510. A part of the memory 1540 may further include a non-volatile random access memory (non-volatile random access memory, NVRAM).

In some implementations, the memory 1540 stores the following elements: an executable module or a data structure, a subset thereof, or an extended set thereof.

In this embodiment of the present invention, a corresponding operation is performed by invoking the operation instruction stored in the memory 1540 (the operation instruction may be stored in an operating system).

In a possible implementation, structures of chips used in a terminal device and a network device are similar, and different apparatuses may use different chips to implement respective functions.

The processor 1510 controls an operation of the terminal device or the network device, and the processor 1510 may also be referred to as a central processing unit (central processing unit, CPU). The memory 1540 may include a read-only memory and a random access memory, and provide an instruction and data for the processor 1510. A part of the memory 1540 may further include a non-volatile random access memory (non-volatile random access memory, NVRAM). For example, in an application, the memory 1540, the communication interface 1530, and the memory 1540 are coupled together through a bus system 1520. The bus system 1520 may further include a power bus, a control bus, a status signal bus, and the like in addition to a data bus. However, for clear description, various buses are marked as the bus system 1520 in FIG. 11.

The foregoing communication unit may be an interface circuit or a communication interface of the apparatus, and is configured to receive a signal from another apparatus. For example, when the apparatus is implemented in a manner of a chip, the communication unit is an interface circuit or a communication interface used by the chip to receive a signal from or send a signal to another chip or apparatus.

The methods disclosed in the foregoing embodiments of the present invention may be applied to the processor 1510, or may be implemented by the processor 1510. The processor 1510 may be an integrated circuit chip, and has a signal processing capability. In an implementation process, the steps in the foregoing methods may be completed by using an integrated logic circuit of hardware in the processor 1510 or an instruction in a form of software. The foregoing processor 1510 may be a general-purpose processor, a digital signal processor (digital signal processing, DSP), an application-specific integrated circuit (application specific integrated circuit, ASIC), a field-programmable gate array (field-programmable gate array, FPGA) or another programmable logic device, a discrete gate or transistor logic device, or a discrete hardware component. The processor 1510 may implement or perform the methods, the steps, and logical block diagrams that are disclosed in embodiments of the present invention. The general-purpose processor may be a microprocessor, and the processor may be alternatively any conventional processor or the like. Steps of the methods disclosed with reference to embodiments of the present invention may be directly performed and accomplished by using a hardware decoding processor, or may be performed and accomplished by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor.

In a possible implementation, the communication interface 1530 is used to perform receiving and sending steps of the terminal device or the network device in the embodiments shown in FIG. 4 to FIG. 7. The processor 1510 is configured to perform processing steps of the terminal device or the network device in the embodiments shown in FIG. 4 to FIG. 7.

In the foregoing embodiment, the instruction that is stored in the memory and that is to be executed by the processor may be implemented in a form of a computer program product. The computer program product may be written into the memory in advance, or may be downloaded and installed in the memory in a form of software.

The computer program product includes one or more computer instructions. When the computer program instruction is loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk, SSD), or the like.

An embodiment of this application further provides a computer-readable storage medium. All or some of the methods described in the foregoing embodiments may be implemented by using software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communication medium, and may further include any medium that can transfer a computer program from one place to another. The storage medium may be any target medium that can be accessed by a computer.

In a possible design, the computer-readable medium may include a RAM, a ROM, an EEPROM, a CD-ROM or another compact disc storage, a magnetic disk storage or another magnetic storage device, or any other medium that is used to carry or store required program code in a form of an instruction or a data structure and that can be accessed by a computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data by using laser light. The foregoing combination should also be included in the scope of the computer-readable medium.

An embodiment of this application further provides a computer program product. All or some of the methods described in the foregoing embodiments may be implemented by using software, hardware, firmware, or any combination thereof. If the methods are implemented in the software, all or some of the methods may be implemented in a form of the computer program product. The computer program product includes one or more computer instructions. When the foregoing computer program instructions are loaded and executed on a computer, the procedures or functions described in the foregoing method embodiments are all or partially generated. The foregoing computer may be a general-purpose computer, a dedicated computer, a computer network, a base station, a terminal, or another programmable apparatus.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A cell selection method, comprising:

sending, by a terminal device, a first request to a network device, wherein the first request requests to select a serving cell for the terminal device in an energy efficiency first manner;

sending, by the terminal device, first information to the network device to enable the network device to select the serving cell from a first communications system or a second communications system; and receiving, by the terminal device, configuration information of the serving cell from the network device based on the first request and the first information, wherein the serving cell is from the first communications system or the second communications system.

2. The cell selection method of claim 1, wherein the first information comprises:

a communications system selection parameter when energy efficiency of the terminal device is first; and transmit power when energy efficiency of the terminal device is first, wherein uplink transmit power of the terminal device is not greater than the transmit power in the serving cell, and wherein before sending the first information to the network device, the cell selection method further comprises:

receiving, by the terminal device, a first bandwidth range and a second bandwidth range from the network device, wherein the first bandwidth range indicates an available bandwidth range of the first communications system, and wherein the second bandwidth range indicates an available bandwidth range of the second communications system; and calculating, by the terminal device based on the first bandwidth range and the second bandwidth range, the communications system selection parameter when energy efficiency of the terminal device is first and the transmit power when energy efficiency of the terminal device is first.

3. The cell selection method of claim 2, wherein calculating the communications system selection parameter when energy efficiency of the terminal device is first comprises:

determining, by the terminal device, a quantity of physical resource blocks of the first communications system and a quantity of physical resource blocks of the second communications system based on the first bandwidth range and the second bandwidth range; and calculating, by the terminal device, the communications system selection parameter when energy efficiency of the terminal device is first, based on total uplink power of the first communications system, an uplink rate of the first communications system, the quantity of the physical resource blocks of the first communications system, a modulation and coding scheme of the first communications system, total uplink power of the second communications system, an uplink rate of the second communications system, the quantity of the physical resource blocks of the second communications system, and a modulation and coding scheme of the second communications system.

4. The cell selection method of claim 3, wherein calculating the communications system selection parameter when energy efficiency of the terminal device is first meets the following formula:

$$\max_{Q,W,MCS} Q \frac{v_1(RB_1, MCS_1)}{P_1} + (1-Q) \frac{v_2(RB_2, MCS_2)}{P_2},$$

wherein Q is the communications system selection parameter, wherein $P_1$ is the total uplink power of the first communications system, wherein $v_1$ is the uplink rate of the first communications system, wherein $RB_1$ is the quantity of the physical resource blocks of the first communications system, wherein $MCS_1$ is the modulation and coding scheme of the first communications system, wherein $P_2$ is the total uplink power of the second communications system, wherein $v_2$ is the uplink rate of the second communications system, wherein $RB_2$ is the quantity of the physical resource blocks of the second communications system, and wherein $MCS_2$ is the modulation and coding scheme of the second communications system.

5. The cell selection method of claim 1, wherein the first information comprises a rate threshold, and wherein the serving cell is based on the rate threshold and a downlink rate of a current task.

6. The cell selection method of claim 5, wherein the first information further comprises first power and second power, wherein the first power is basic consumed power of the terminal device in the first communications system, wherein the second power is basic consumed power of the terminal device in the second communications system, wherein the first power is less than the second power, and wherein the serving cell is based on the downlink rate of the current task, the rate threshold, the first power, and the second power.

7. The cell selection method of claim 6, wherein when the downlink rate of the current task is less than or equal to the rate threshold, the serving cell is a cell in the first communications system, and wherein when the downlink rate of the current task is greater than the rate threshold, selecting of the serving cell meets the following formula:

$$\max_{x,W,MCS} x \frac{v_3(RB_3, MCS_3)}{P_3} + (1-x)\frac{v_4(RB_4, MCS_4)}{P_4},$$

wherein x is a discrete binary function of 0 or 1, wherein $P_3$ is the first power, wherein $v_3$ is a downlink rate of the first communications system, wherein $RB_3$ is a quantity of physical resource blocks of the first communications system, wherein $MCS_3$ is a modulation and coding scheme of the first communications system, wherein $P_4$ is the second power, wherein $v_4$ is a downlink rate of the second communications system, wherein $RB_4$ is a quantity of physical resource blocks of the second communications system, and wherein $MCS_4$ is a modulation and coding scheme of the second communications system.

8. The cell selection method of claim 1, wherein sending the first request to the network device comprises:
sending, by the terminal device, the first request to the network device based on a user configuration;
sending, by the terminal device when detecting that remaining battery power is less than a battery power threshold, the first request to the network device; or
displaying, by the terminal device when detecting that remaining battery power is less than a battery power threshold, a user interface used to prompt a user to configure energy efficiency first, and sending, by the terminal device, the first request to the network device based on a configuration received from the user interface.

9. A cell selection method, comprising:
receiving, by a network device, a first request and first information from a terminal device, wherein the first request requests to select a serving cell for the terminal device in an energy efficiency first manner, and wherein the first information enables selection of a serving cell in a first communications system or a second communications system for the terminal device;
selecting, by the network device, the serving cell based on the first request and the first information; and
sending, by the network device, configuration information of the serving cell to the terminal device.

10. The cell selection method of claim 9, wherein selecting the serving cell based on the first request and the first information comprises:
sending, by the network device, a first bandwidth range and a second bandwidth range to the terminal device based on the first request, wherein the first bandwidth range indicates an available bandwidth range of the first communications system, and wherein the second bandwidth range indicates an available bandwidth range of the second communications system;
receiving, by the network device, the first information from the terminal device, wherein the first information comprises a communications system selection parameter and transmit power, and wherein the communications system selection parameter and the transmit power are based on the first bandwidth range and the second bandwidth range when energy efficiency of the terminal device is first; and
selecting, by the network device, the serving cell based on the communications system selection parameter and the transmit power, wherein uplink transmit power of the terminal device is not greater than the transmit power in the serving cell.

11. The cell selection method of claim 10, wherein obtaining of the communications system selection parameter and the transmit power comprises:
determining, by the terminal device, a quantity of physical resource blocks of the first communications system and a quantity of physical resource blocks of the second communications system based on the first bandwidth range and the second bandwidth range; and
calculating, by the terminal device, the communications system selection parameter when energy efficiency of the terminal device is first, based on total uplink power of the first communications system, an uplink rate of the first communications system, the quantity of the physical resource blocks of the first communications system, a modulation and coding scheme of the first communications system, total uplink power of the second communications system, an uplink rate of the second communications system, the quantity of the physical resource blocks of the second communications system, and a modulation and coding scheme of the second communications system.

12. The cell selection method of claim 11, wherein obtaining of the communications system selection parameter meets the following formula:

$$\max_{Q,W,MCS} Q\frac{v_1(RB_1, MCS_1)}{P_1} + (1-Q)\frac{v_2(RB_2, MCS_2)}{P_2},$$

wherein Q is the communications system selection parameter, wherein $P_1$ is the total uplink power of the first communications system, wherein $v_1$ is the uplink rate of the first communications system, wherein $RB_1$ is the quantity of the physical resource blocks of the first communications system, wherein $MCS_1$ is the modulation and coding scheme of the first communications system, wherein $P_2$ is the total uplink power of the second communications system, wherein $v_2$ is the uplink rate of the second communications system, wherein $RB_2$ is the quantity of the physical resource blocks of the second communications system, and wherein $MCS_2$ is the modulation and coding scheme of the second communications system.

13. The cell selection method of claim 9, wherein the first information comprises a rate threshold, and wherein selecting the serving cell for the terminal device based on the first request and the first information comprises selecting, by the network device, the serving cell based on the rate threshold and a downlink rate of a current task.

14. The cell selection method of claim 13, wherein the first information further comprises first power and second power, wherein the first power is basic consumed power of the terminal device in the first communications system, wherein the second power is basic consumed power of the terminal device in the second communications system, wherein the first power is less than the second power, and wherein selecting the serving cell for the terminal device based on the first request and the first information comprises selecting, by the network device, the serving cell based on the downlink rate of the current task, the rate threshold, the first power, and the second power.

15. The cell selection method of claim 14, wherein selecting the serving cell based on the downlink rate of the current task, the rate threshold, the first power, and the second power comprises:
   selecting, by the network device when the downlink rate of the current task is less than or equal to the rate threshold, the serving cell that is a cell in the first communications system; and
   selecting, by the network device when the downlink rate of the current task is greater than the rate threshold, the serving cell meets the following formula:

$$\max_{x,W,MCS} x \frac{v_3(RB_3, MCS_3)}{P_3} + (1-x) \frac{v_4(RB_4, MCS_4)}{P_4},$$

wherein x is a discrete binary function of 0 or 1, wherein $P_3$ is the first power, wherein $v_3$ is a downlink rate of the first communications system, wherein $RB_3$ is a quantity of physical resource blocks of the first communications system, wherein $MCS_3$ is a modulation and coding scheme of the first communications system, wherein $P_4$ is the second power, wherein $v_4$ is a downlink rate of the second communications system, wherein $RB_4$ is a quantity of physical resource blocks of the second communications system, and wherein $MCS_4$ is a modulation and coding scheme of the second communications system.

16. The cell selection method of claim 9, wherein receiving the first request comprises:
   receiving the first request from the terminal device based on a user configuration;
   receiving the first request when remaining battery power is lower than a battery power threshold; or
   receiving, when the remaining battery power is less than a battery power threshold, the first request based on a configuration received from a user interface of the terminal device, wherein the user interface is configured to prompt a user to configure energy efficiency first.

17. A terminal device, comprising:
   a memory configured to store a computer program or an instruction; and
   a processor coupled to the memory and configured to run the computer program or the instruction to cause the terminal device to:
      send a first request to a network device, wherein the first request requests to select a serving cell for the terminal device in an energy efficiency first manner;
      send first information to the network device to enable the network device to select the serving cell from a first communications system or a second communications system; and
      receive configuration information of the serving cell from the network device based on the first request and the first information,
      wherein the serving cell is from the first communications system or the second communications system.

18. The terminal device of claim 17, wherein the first information comprises:
   a communications system selection parameter when energy efficiency of the terminal device is first; and
   transmit power when energy efficiency of the terminal device is first,
   wherein uplink transmit power of the terminal device is not greater than the transmit power in the serving cell, and
   wherein before sending the first information to the network device, the processor is configured to cause the terminal device to:
      receive a first bandwidth range and a second bandwidth range from the network device, wherein the first bandwidth range indicates an available bandwidth range of the first communications system, and wherein the second bandwidth range indicates an available bandwidth range of the second communications system; and
      calculate, based on the first bandwidth range and the second bandwidth range, the communications system selection parameter when energy efficiency of the terminal device is first, and the transmit power when energy efficiency of the terminal device is first.

19. The terminal device of claim 18, wherein calculating based on the first bandwidth range and the second bandwidth range, the communications system selection parameter when energy efficiency of the terminal device is first, comprises:
   determining a quantity of physical resource blocks of the first communications system and a quantity of physical resource blocks of the second communications system based on the first bandwidth range and the second bandwidth range; and
   calculating the communications system selection parameter when energy efficiency of the terminal device is first, based on total uplink power of the first communications system, an uplink rate of the first communications system, the quantity of the physical resource blocks of the first communications system, a modulation and coding scheme of the first communications system, total uplink power of the second communications system, an uplink rate of the second communications system, the quantity of the physical resource blocks of the second communications system, and a modulation and coding scheme of the second communications system.

20. The terminal device of claim 19, wherein calculating the communications system selection parameter when energy efficiency of the terminal device is first meets the following formula:

$$\max_{Q,W,MCS} Q \frac{v_1(RB_1, MCS_1)}{P_1} + (1-Q)\frac{v_2(RB_2, MCS_2)}{P_2},$$

wherein Q is the communications system selection parameter, wherein $P_1$ is the total uplink power of the first communications system, wherein $v_1$ is the uplink rate of the first communications system, wherein $RB_1$ is the quantity of the physical resource blocks of the first communications system, wherein $MCS_1$ is the modulation and coding scheme of the first communications system, wherein $P_2$ is the total uplink power of the second communications system, wherein $v_2$ is the uplink rate of the second communications system, wherein $RB_2$ is the quantity of the physical resource blocks of the second communications system, and wherein $MCS_2$ is the modulation and coding scheme of the second communications system.

* * * * *